(12) United States Patent
Nakatomi et al.

(10) Patent No.: US 8,664,926 B2
(45) Date of Patent: Mar. 4, 2014

(54) DC-DC CONVERTER AND POWER SUPPLYING SYSTEM USING A DC-DC CONVERTER

(75) Inventors: Somei Nakatomi, Saitama (JP); Yasuto Watanabe, Saitama (JP); Keigo Andoh, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 12/750,785

(22) Filed: Mar. 31, 2010

(65) Prior Publication Data

US 2010/0244798 A1    Sep. 30, 2010

(30) Foreign Application Priority Data

Mar. 31, 2009 (JP) ................. 2009-084888

(51) Int. Cl.
*H02M 3/156* (2006.01)

(52) U.S. Cl.
USPC .............................. 323/282; 323/268; 363/37

(58) Field of Classification Search
USPC ................... 323/22–225, 268, 271
See application file for complete search history.

(56) References Cited

U.S. PATENT DOCUMENTS

| | | | |
|---|---|---|---|
| 5,229,928 A * | 7/1993 | Karlsson et al. ................ 363/65 |
| 5,771,163 A * | 6/1998 | Moriguchi et al. ............. 363/71 |
| 6,314,007 B2 * | 11/2001 | Johnson et al. ................ 363/37 |
| 6,552,606 B1 * | 4/2003 | Veltman et al. ................ 330/10 |
| 2004/0105288 A1 * | 6/2004 | Watanabe et al. ............. 363/132 |
| 2005/0127881 A1 * | 6/2005 | Sase et al. ..................... 323/225 |
| 2005/0174098 A1 * | 8/2005 | Watanabe et al. ............. 323/282 |

FOREIGN PATENT DOCUMENTS

| | | |
|---|---|---|
| JP | 2005-224060 | 8/2005 |
| JP | 2008-022625 A | 1/2008 |
| JP | 2008-141871 A | 6/2008 |

OTHER PUBLICATIONS

Office Action dated Mar. 19, 2013 for corresponding Japanese Patent Application No. 2009-084888.

* cited by examiner

*Primary Examiner* — Adolf Berhane
*Assistant Examiner* — Gustavo Rosario Benitez
(74) *Attorney, Agent, or Firm* — Squire Sanders (US) LLP

(57) ABSTRACT

A DC-DC converter includes first and second capacitors connected in series, a switching part, and a control circuit part which includes a voltage difference calculating part for calculating a difference between voltages of the first and second capacitors, a duty ratio controller for controlling duty ratio of on- and OFF-durations to decrease the voltage difference of the first and second capacitors on the basis of the calculated difference. A power supplying system including the DC-DC converter controls balance between first and second capacitors in voltage on the basis of the powering/regenerating discriminating signal.

6 Claims, 10 Drawing Sheets

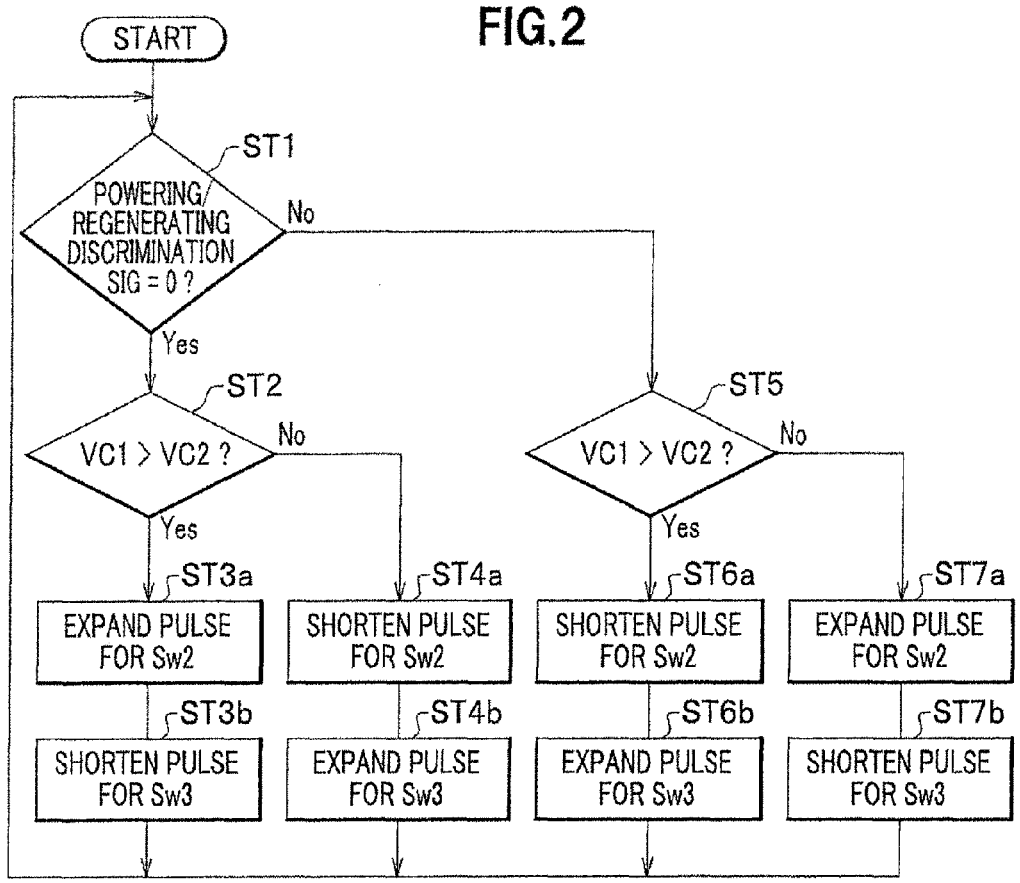

DC-DC CONVERTER AND POWER SUPPLYING SYSTEM USING A DC-DC CONVERTER

CROSS REFERENCE TO RELATED APPLICATIONS

This application claims the foreign priority benefit under Title 35, United States Code, §119(a)-(d) of Japanese Patent Application No. 2009-084888, filed on Mar. 31, 2009 in the Japan Patent Office, the disclosure of which is herein incorporated by reference in its entirety.

BACKGROUND OF THE INVENTION

1. Field of the Invention

The present invention relates to a DC (direct current)-DC converter and a power supplying system using the same, and particularly to a capacitive type of DC-DC converter capable of power converting bi-directionally and a power supplying system using the same.

2. Description of the Related Art

A DC-DC converter is known which includes two capacitors connected in series and switches alternately charging or discharging the capacitors. A boosting rate and bucking rate are variable. JP 2005-224060 discloses such a DC-DC converter.

SUMMARY OF THE INVENTION

A first aspect of the present invention provides a DC-DC converter comprising: a first input-output circuit; first and second capacitors connected in series; a second input-output circuit connected to the first and second capacitors; a switching part, responsive to switching signals comprising: a first switch configured to connect a positive side terminal of the first input-output circuit to a positive terminal of the first capacitor and a positive side terminal of the second input-output circuit; a second switch configured to connect the positive side terminal of the first input-output circuit to a negative terminal of the first capacitor and a positive terminal of the second capacitor; a third switch configured to connect a negative side terminal of the first input-output circuit to the negative terminal of the first capacitor and the positive terminal of the second capacitor; and a fourth switch configured to connect the negative side terminal of the first input-output circuit to a negative terminal of the second capacitor and the negative side terminal of the second input-output circuit; a voltage detector to detect voltages across the first and second capacitors and a voltage through the first and second capacitors; and a control circuit part configured to generate the switching signals control on the basis of the voltage through the first and second capacitors, calculate a difference between the voltages across first and second capacitors and controls a duty ratio of at least one of the switching signals on the basis of the difference so as to decrease the difference.

In this aspect, the DC-DC converter can perform boosting and bucking operations because the switching part includes the first to fourth switches. Further, the DC-DC converter may control duration of on and off of the second and fourth switches to control an output voltage on the basis of a desired voltage command. In addition to this basic operation, in boosting, the control circuit part in the DC-DC converter may calculate a difference in voltage between the first and second capacitors. Therefore, when there is unbalance in voltage between the first and second capacitors, the control circuit part may vary duration of on or off of at least one of the second and third switches to decrease the calculated difference to balance the voltage of the first and second capacitors.

The DC-DC converter may control duration of on and off of the first and fourth switches in bucking to control an output voltage on the basis of the desired voltage command.

In addition to this basic operation, in bucking, the control circuit part of the DC-DC converter calculates a difference in voltage between the first and second capacitors. Therefore, while the DC-DC converter outputs a voltage on the basis of the voltage command, if the detected voltage of the first and second capacitors may be unbalanced, the voltages of the first and second capacitors can have balance of the first and second capacitors in the detected voltages by varying duration of on and off of at least one of the first and fourth switches so as to decrease the calculated difference. As a result, unbalance in voltage load can be prevented. With this configuration, a margin for unbalance in voltages between two capacitors can be omitted.

A second aspect of the present invention provides a DC-DC converter comprising: a first input-output circuit; first and second capacitors connected in series; a second input-output circuit connected to the first and second capacitors; a switching part, responsive to switching signals comprising: a first diode configured to connect a positive side terminal of the first input-output circuit to a positive terminal of the first capacitor and a positive side terminal of the second input-output circuit; a first switch configured to connect the positive side terminal of the first input-output circuit to a negative terminal of the first capacitor and a positive terminal of the second capacitor; a second switch configured to connect a negative side terminal of the first input-output circuit to the negative terminal of the first capacitor and the positive terminal of the second capacitor; and a second diode configured to connect the negative side terminal of the first input-output circuit to a negative terminal of the second capacitor and the negative side terminal of the second input-output circuit; a voltage detector to detect voltages across the first and second capacitors and a voltage through the first and second capacitors; and a control circuit part configured to generate the switching signals control on the basis of the voltage through the first and second capacitors, calculate a difference between the voltages across first and second capacitors and controls a duty ratio of at least one of the switching signals on the basis of the difference so as to decrease the difference.

In the second aspect, the switching part of the DC-DC converter includes the first and second switches connected in series and first and second diodes connected to the first and second switches, respectively, so that a boosting operation is possible. In addition to this basic operation, the control circuit part in the DC-DC converter, calculates the difference in voltage between the first and second capacitors. Accordingly, when there may be unbalance between detection voltages of the first and second capacitors in the DC-DC converter, in addition to outputting a voltage based on the voltage command, the control circuit part varies duration of on and off of at least one of the first and second switches to decreases the difference to have balance. Accordingly dispersion in temperature of the switches can be suppressed. As a result, unbalance in voltage load can be prevented. In this aspect, a margin for unbalance in the voltage load can be eliminated in designing. Further, the number of the switches can be decreased by utilizing switching function (rectifying operation) of the diode with decrease in manufacturing cost.

A third aspect of the present invention provides a DC-DC converter comprising: a first input-output circuit; first and second capacitors connected in series; a second input-output circuit connected to the first and second capacitors; a switching part, responsive to switching signals comprising: a first switch configured to connect a positive side terminal of the first input-output circuit to a positive terminal of the first capacitor and a positive side terminal of the second input-output circuit; a first diode configured to connect the positive side terminal of the first input-output circuit to a negative terminal of the first capacitor and a positive terminal of the second capacitor; a second diode configured to connect the negative terminal of the first capacitor and the positive terminal of the second capacitor to a negative side terminal of the first input-output circuit to; and a second switch configured to connect the negative side terminal of the first input-output circuit to a negative terminal of the second capacitor and the negative side terminal of the second input-output circuit; a voltage detector to detect voltages across the first and second capacitors and a voltage through the first and second capacitors; and a control circuit part configured to generate the switching signals control on the basis of the voltage through the first and second capacitors, calculate a difference between the voltages across first and second capacitors and controls a duty ratio of at least one of the switching signals on the basis of the difference so as to decrease the difference.

In the third aspect, the switching part in the DC-DC converter includes first and second diodes and first and second switches between the first and second switches, so that a bucking operation is possible. In addition to this basic operation, the control circuit part in the DC-DC converter calculates the difference in voltage between the first and second capacitors. Accordingly, when there may be unbalance between detection voltages of the first and second capacitors in the DC-DC converter, in addition to outputting a voltage based on the voltage command, the control circuit part varies on and OFF-durations of at least one of the first and second switches to decrease the difference to have balance. Accordingly dispersion in temperature of the switches can be suppressed. As a result, unbalance in voltage load can be prevented. In this aspect, a margin for unbalance in the voltage load can be eliminated in design. Further, the number of the switches can be decreased by utilizing switching function (rectifying operation) of the diode with decrease in manufacturing cost.

A fourth aspect of the present invention provides the DC-DC converter based on the first aspect, wherein the control circuit part controls a pulse duration to control the duty ratio of at least one of the switching signals to correct an unbalance in the voltage of the first and second capacitors on the basis of the detected voltages across the first and second capacitors.

In the fourth aspect, the voltage difference between two capacitors can be decreased by controlling a pulse duration of the switching signal. For example, a quantity of charging the capacitor having the low voltage is made greater than that of charging the capacitor having the high voltage by performing at least one of the followings:

In boosting, pulse durations for the switch charging the capacitor having a low voltage are expanded; and The pulse durations for the switch charging the capacitor having a high voltage are shortened.

These operations can decrease the voltage difference between two capacitors. Thus, although unbalance in voltage between two capacitors may occur, the unbalance can be corrected.

A fifth aspect of the present invention provides the DC-DC converter based on the first aspect, wherein the control circuit part controls a phase of a pulse in one of the switching signals to control the duty ratios of the switching durations for generating a current flowing in series through the first and second capacitor.

In the fifth aspect, a phase of pulses of the switching signals is shifted to decrease the voltage difference between two capacitors. For example, a quantity of charging the capacitor having the low voltage is made greater than that of charging the capacitor having the high voltage by performing at least one of the followings:

For example, a pulse for the switch charging the capacitor having a higher voltage is delayed; and the pulse for the switch charging the capacitor having a low voltage is advanced.

Thus, a quantity of charging the capacitor having the low voltage is made greater than that of charging the capacitor having the high voltage. A quantity of discharging the capacitor having the higher voltage is made greater than that of discharging the capacitor having the lower voltage. This decreases the voltage difference between two capacitors.

Thus, although unbalance in voltage between two capacitors occurs, the unbalance can be corrected.

A sixth aspect of the present invention provides the DC-DC converter based on the first aspect, wherein the control circuit part comprises a voltage balance controller configured to decrease the difference: a first low-pass filter configured to extract a DC voltage component across the first capacitor; a second low-pass filter configured to extract a DC voltage component across the second capacitor; a difference calculating part configured to calculate a first difference between the DC voltage components across first and second capacitors and a second difference between the first difference and a reference value; a proportion and integral unit configured to generate a control quantity including a proportion control quantity and an integration control quantity on the basis of the second difference; and a duty control part configured to control the duty ratio on the basis of the control quantity.

In the sixth aspect, the first and second low-pass filters detect DC components in which ripple components are removed.

Accordingly an accurate control quantity and a command signal can be supplied to the switching part to accurately decrease voltage difference between two capacitors.

A seventh aspect of the present invention provides a power supplying system comprising: the DC-DC converter based on the sixth aspect; a power supply configured to supply a DC voltage to the DC-DC converter; an electrical rotating machine connected to the DC-DC converter; a current sensor configured to detect a current flowing between the DC-DC converter and the electrical rotating machine; and a powering/regenerating discriminating part, connected to the second input-output circuit, configured to determine whether the DC-DC converter is in either a powering mode or a regenerating mode on the basis of the detected current, wherein the voltage balance controller decreases the difference on the basis of the powering mode or the regenerating mode.

In the seventh aspect, the voltage difference between two capacitors is decreased on the basis of a powering/regenerating discrimination signal indicating whether the electrical rotating machine is in a powering mode or a regenerating mode. When the electrical rotating machine is in powering, the quantity of charging is controlled, and when the electrical rotating machine is in regenerating, the quantity of discharging is controlled to decrease the voltage difference. In accordance with a state of the electrical rotating machine, the capacitor of which the quantity of charging or the quantity of discharged is to be increased is switched. For example, in powering, the quantity of charging the second capacitor is increased when the detected voltage of the first capacitor is greater than that of the second capacitor. On the other hand, in regenerating, the quantity of discharging the second capacitor is increased when the detected voltage of the second capacitor is greater than that of the first capacitor. However, when the voltage difference between two capacitors is decreased by controlling the phase of the pulse of the switching signal, switching the capacitors to be charged or discharged at more quantity may not be necessary.

A further aspect of the present invention provides suppression of dispersion in temperature of switches and suppression of unbalance in voltage load on the capacitors. This may prevent increase in withstanding voltage of the capacitor and provide a stable operation, and down-sizing the DC-DC converter.

BRIEF DESCRIPTION OF THE DRAWINGS

The object and features of the present invention will become more readily apparent from the following detailed description taken in conjunction with the accompanying drawings in which:

FIG. 2 is a flowchart showing a balance control operation in the DC-DC converter shown in FIG. 1;

The same or corresponding elements or parts are designated with like references throughout the drawings.

DETAILED DESCRIPTION OF THE INVENTION

Figure 1:
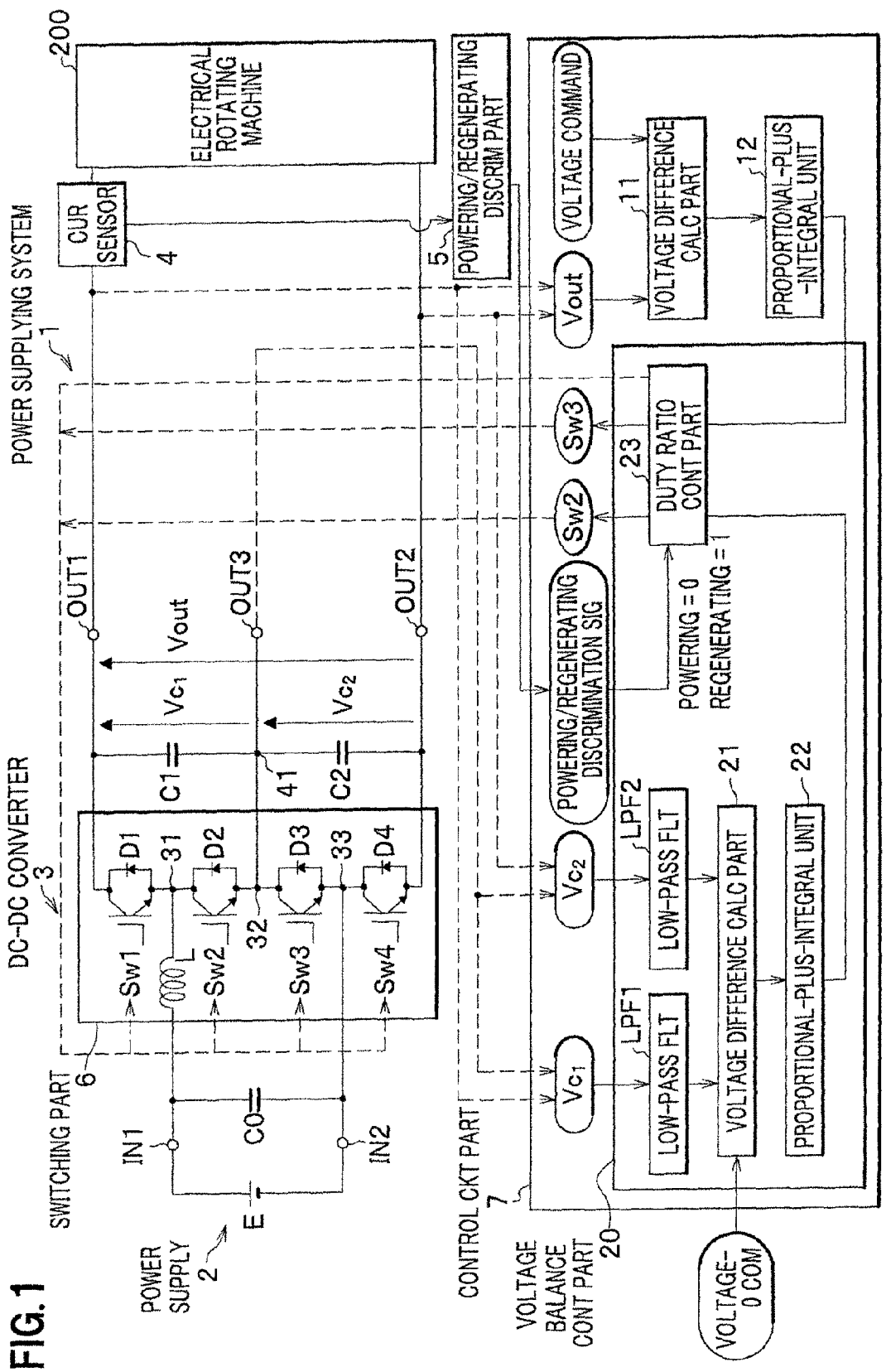
FIG. 1 is a block diagram of a power supplying system including a DC-DC converter according to a first embodiment of the present invention.

Prior to describing an embodiment of the present invention, the above-mentioned related art will be further explained. In the prior art of JP 2005-224060, there may be an unbalance in voltages across two capacitors connected in series in the DC-DC converter. This may cause a difference in temperature between two capacitors, so that a load on one of the capacitor becomes greater than that of the other capacitor. Thus, there may be a deviation in electrical load between the capacitors. Further, a specification or requirement (withstanding voltage) of the capacitors should be made high grade in consideration of margin greater than the unbalance voltage.

With reference to drawings will be described embodiments of DC-DC converters and power supplying systems according to the present invention.

First will be described general configurations of a DC-DC converter and a power supplying system according to the present invention. Next, will be described a power supplying system using a DC-DC converter according to a first embodiment. After that, will be described a power supplying system using a DC-DC converter according to a second embodiment. Next will be described power supplying systems using DC-DC converters according to third and fourth embodiments.

[General Configuration of DC-DC Converter and Power Supplying System]

<General Configuration of DC-DC Converter>

There are three types of DC-DC converters in the embodiments of the present invention, and there are two methods of duty ratio control. Will be described three types of the DC-DC converter. First, the DC-DC converter 3 according to the first embodiment (see FIG. 1) includes two capacitors C1 and C2 connected in series and four switches Sw1 to Sw4 and is capable of boosting and bucking operations. In this boosting and bucking type of the DC-DC converter, for example, the switches Sw1 to Sw4 comprise IGBT (Insulated Gate Bipolar Transistor) which is on and OFF-durations are controlled by gate voltages (switching signal). In the first embodiment, a H level duration on a waveform of the switching signal turns on a switch, and a width is referred to as a duration (pulse duration). On and off periods of the gate waveforms of the switches Sw1 to Sw4 are equal to each other. An ON-duration of the gate waveform for the switch Sw1 (see FIG. 4B) is equal to an OFF-duration of the gate waveform for the switch Sw2 (see FIG. 3B). An ON-duration of the gate waveform for the switch Sw3 (see FIG. 3B) is equal to an OFF-duration of the gate waveform for the switch Sw4 (see FIG. 4B). A DC-DC converter 3B (see FIG. 9) according to the third embodiment is a second type of the DC-DC converter. Two switches Sw1 and Sw4 in the first type of DC-DC converter 3 are replaced with diodes to change the first type of DC-DC converter (boosting and bucking type) to a boosting type DC-DC converter. In other words, controlling gate waveforms for the switches Sw2 and Sw3 provides a boosting operation. The DC-DC converter 3A (see FIG. 5) according to the second embodiment has the same circuit configuration as the DC-DC converter 3 (see FIG. 1) according to the first embodiment, but has different control method (second type of control method). In the DC-DC converter 3C according to the fourth embodiment (see FIG. 10), two switches Sw2 and Sw3 of the boosting and bucking type of DC-DC converter 3 are replaced with diodes to provide a bucking type of DC-DC converter 3C. In other words, controlling gate waveforms for the switches Sw1 and Sw4 provide a bucking operation.

Will be described first and second control methods.

The first control method is to vary a duty ratio of the switching signal for charging and discharging either of the capacitors, when an unbalance in capacitor voltages is detected. For example, in boosting, a pulse width on gate voltage waveforms for two switches Sw2 and Sw3 is controlled to make a difference zero in voltages across the capacitors C1 and C2 connected in series. On the other hand, in bucking, the pulse width on gate voltage waveforms for two switches Sw1 and Sw4 is controlled to make a difference zero in voltages across the capacitors C1 and C2 connected in series. In these operations, between boosting and bucking, the control methods are switched (mentioned later). This control method will be described with the DC-DC converters 3 according to the first embodiment (see FIG. 1).

A second control method is a phase control, wherein when unbalance in capacitor voltages is detected, a phase of pulse on the switching signal is varied. More specifically, duration (duty ratio) of a current flowing both first and second capacitors C1 and C2 is controlled. For example, in boosting a phase relation of pulses on gate waveforms for two switches Sw2 and Sw3 is controlled. On the other hand, in bucking the phase relation of pulses on gate waveforms for two switches Sw1 and Sw4 is controlled. This makes the difference in voltage across the first and second capacitors zero. In the second control method, the control method is not switched between boosting and bucking. The second control method will be described with the DC-DC converter 3A according to the second embodiment (see FIG. 5).

<General Configuration of Power Supplying System>

The DC-DC converter according to the present invention is independently usable. However, the DC-DC converter can be used in the power supplying system according to the present invention that can determine whether operation is in boosting or bucking and perform the duty ratio control. Then, will be described such a DC-DC converter in detail. Next, will be described a power supplying system using the DC-DC converter used in a power supplying system that can perform the phase control.

Power Supplying System According to First Embodiment

As shown in FIG. 1, the power supplying system 1 according to the first embodiment, generates a DC power obtained by voltage conversion between an electrical rotating machine 200 and a power supply 2 and includes the power supply 2, a DC-DC converter 3, a current sensor 4, and a powering/regenerating discriminating part 5 that determines whether the operation is in powering (power running) or regenerating. The electrical rotating machine 200 is, for example, a motor or a generator in a vehicle or the like.

The power supply 2 is, for example, a battery, and supplies a predetermined DC voltage E to the electrical rotating machine 200.

The DC-DC converter 3 converts an inputted DC power supply voltage E into another DC voltage and supplies another DC voltage to the electrical rotating machine 200.

The current sensor 4 detects a DC current flowing between the electrical rotating machine 200 and the power supply 2 and supplies the detected current value to the powering/regenerating discriminating part 5.

The powering/regenerating discriminating part 5 determines whether the electrical rotating machine 200 is in a powering state or a regenerating state and supplies the determination result to the DC-DC converter 3. In the embodiments of the present invention, a powering/regenerating determination signal is set to "0" when the operating state of the electrical rotating machine 200 is powering (in a powering mode, i.e., boosting) and "1" when the operating state of the electrical rotating machine 200 is regenerating (in a regenerating mode, i.e., bucking). The setting of the powering/regenerating determination signal is not limited to this. For example, in the regenerating mode, if the electrical rotating machine 200 is a motor, a revolution speed of the motor is decreased (regenerative braking operation). When a voltage on a side of a load increases, the voltage on the load is bucked to charge the power supply 2 on the input side (return energy to the input side). Further, it is also possible to use a brake signal as the powering/regenerating determination signal. For example, when a brake is not depressed, the operation is in the powering mode, and when the brake is depressed, the operation is in the regenerating mode. Thus, the brake signal is used to determine between the powering and regenerating.

[DC-DC Converter]

The DC-DC converter 3 includes positive and negative input terminals IN1 and IN2 as a DC power supply input circuit (input-output circuit). The DC-DC converter 3 further includes two capacitors C1 and C2 connected in series, an output circuit (input-output circuit) including output terminals OUT1 and OUT2 connected to the capacitor C1 and C2, and a switching part 6, and a control circuit part 7. Here, the capacitors C1 and C2 are referred to as a first capacitor C1 and a second capacitor C2.

<Switching Part>

The switching part 6 includes switches Sw1 to Sw4 comprising, for example IGBTs with diodes D1 to D4 and performing switching connection between the DC power supply input part and the capacitors C1 and C2. If the switches Sw1 to Sw4 comprise MOS FET (metal oxide field effect transistor), MOS FET's parasitic diodes operate as the diodes D1 to D4. The DC-DC converter 3 according to the first embodiment includes in the switching part 6, a first switch Sw1, a second switch Sw2, a third switch Sw3, and a fourth switch Sw4.

The first switch Sw1 connects the positive side input terminal IN1 to a positive terminal of a first capacitor C1 and a positive side of an output terminal OUT1 in an on-state thereof.

The second switch Sw2 connects the positive side input terminal IN1 to a negative terminal of the first capacitor C1 and a positive terminal of the second capacitor C2 in an on-state thereof.

The third switch Sw3 connects the negative side input terminal IN2 to the negative terminal of the first capacitor C1 and the positive terminal of the second capacitor in an on-state thereof.

The fourth switch Sw4 connects the negative input terminal IN2 to the negative terminal of the second capacitor C2 and to the negative side of the output terminal OUT2.

An inductor L is provided between the positive input terminal IN1 and a junction 31 between the first switch Sw1 and the second switch Sw2. Further, a junction 32 between the second switch Sw2 and the third switch Sw3 is connected to a junction 41 between the first capacitor C1 and the second capacitor C2. The junction 41 is connected to the intermediate output terminal OUT3. More specifically, measuring a voltage between the intermediate output terminal OUT3 and the positive output terminal OUT1 provides detection of a voltage $V_{C1}$ of the first capacitor C1. Further, measuring a voltage between the intermediate output terminal OUT3 and the negative side output terminal OUT2 provides detection of a voltage $V_{C2}$ of the second capacitor C2. A voltage between the positive side output terminal OUT1 and the negative side output terminal OUT2 is an output voltage Vout. A junction 33 between the third switch Sw3 and the fourth switch Sw4 is connected to the negative side input terminal IN2. The positive side input terminal IN1 and the negative side input terminal IN2 are connected to the power supply 2 having a DC power supply voltage E. Further, provided between the positive side input terminal IN1 and the negative side input terminal IN 2 is a smoothing capacitor C0 (an electrochemical capacitor, a film capacitor, or a ceramic capacitor). The smoothing capacitor C0 is provided to decrease an output impedance of the power supply 2. For example, if wiring between the power supply 2 and the positive and negative side terminals IN1 and IN2 becomes long, in which case, the output impedance may increase, the smoothing capacitor C0 prevents this.

<Control Circuit Part>

The control circuit part 7 controls a duty ratio between on and OFF-durations (duratiON-duty cycle) for the switching part 6 on the basis of the voltage supplied by the output circuit and a voltage command.

The control circuit part 7 has a function as a feature of the present invention in which the control circuit part 7 calculates a difference between the voltage $V_{C1}$ of the first capacitor C1 and the voltage $V_{C2}$ of the second capacitor C2 and the duty ratio is controlled so as to decrease the voltage difference between the first and second capacitors C1 and C2. In the first embodiment, the control circuit part 7 controls pulse durations of switching signals to control output voltage toward the voltage command with a voltage difference calculating part 11 and a proportional-plus-integral unit 12, and further to control the duty ratio to decrease the voltage difference between the first and second capacitors C1 and C2 with a voltage balance controller 20.

Accordingly, the control circuit part 7 includes the voltage difference calculating part 11, the proportional integrator 12, and the voltage balance control unit 20.

The voltage difference calculating part 11 calculates a difference between the output voltage Vout at the output circuit and a predetermined voltage command.

The proportional-plus-integral unit 12 calculates a control quantity (a first control quantity) for equalizing the voltage Vout to a predetermined voltage command (a desired output voltage) through a PI control which is a combination of a proportional control (P) and an integration operation (I). The quantity calculated by the proportional-plus-integral unit 12 is supplied to a duty ratio controller (switching signal generator) 23 in the voltage balance controller 20.

<Voltage Balance Controller>

The voltage balance controller 20 is provided to decrease a voltage difference between the voltage $V_{C1}$ of the first capacitor C1 and the voltage $V_{C2}$ of the second capacitor C2 and includes the first low-pass filter LPF1, the second low-pass filter LPF2, a voltage difference calculating part 21, and the proportional-plus-integral unit 22, the duty ratio controller 23.

The first and second low-pass filters LPF1 and LPF2 remove unnecessary components and extract the voltages $V_{C1}$ and $V_{C2}$, respectively. The detected voltage of the first capacitor C1 and the detected voltage of the second capacitor C2 include ripple components. Because the ripple components may disturb operation to balance the voltages $V_{C1}$ and $V_{C2}$, the ripple components are removed by the first and second low-pass filters LPF1 and LPF2 to extract DC-components as the voltages $V_{C1}$ and $V_{C2}$. Thus, hereinafter the DC-components are referred to as the voltages $V_{C1}$ and $V_{C2}$.

The voltage difference calculating part 21 calculates a difference between the output voltage of the first low-pass filter LPF1 ($V_{C1}$) and the output voltage of the second low-pass filter LPF2 ($V_{C2}$). The voltage difference calculating part 21 further calculates a difference between the voltage-0 command for making the difference between the voltages $V_{C1}$ and $V_{C2}$ zero. In the first embodiment, the voltage difference between the capacitor C1 and C2 is detected from, for example, the voltage difference $\Delta(V_{C1}-V_{C2})$, i.e., the difference between the output voltage of the first and second low-pass filters LPF1 and LPF2. In other words, when the voltage difference $\Delta(V_{C1}-V_{C2})$ is positive, the output voltage $V_{C1}$ of the first low-pass filter LPF1 is greater than that of the second low-pass filter LPF2, and when the voltage difference $\Delta(V_{C1}-V_{C2})$ is negative, the output voltage $V_{C2}$ of the second low-pass filter LPF2 is greater than that of the first low-pass filter LPF1.

The voltage-0 command is to make the difference $\Delta(V_{C1}-V_{C2})$ zero. In the first embodiment, the voltage difference calculating part 21 further calculates the differences by subtracting zero from the output voltages of the first and second low-pass filters LPF1 and LPF2. The voltage difference calculating part 21 calculates and supplies the voltage difference between two capacitors $\Delta(V_{C1}-V_{C2})$ as well as the difference between "zero" and $V_{C1}$ and the difference between "zero" and $V_{C2}$ to the proportional-plus-integral unit 22. In the first embodiment, the voltage-0 command is externally set and inputted into the control circuit part 7. However, the voltage-0 command may be previously stored in a memory (not shown) in the control circuit part 7 and read out from the memory by the voltage difference calculating part 21.

The proportional-plus-integral unit 22 obtains differences between the differences obtained by PI control and predetermined reference values. The proportional-plus-integral unit 22 calculates a control quantity (a second control quantity) for varying the duty ratio of the switching signals so as to decrease an unbalance in capacitor voltage through proportional-plus-integral operation. The references value may be plural for each range of output voltage $V_{C1}$ of the first low-pass filter LPF1 in accordance with the voltage difference $\Delta(V_{C1}-V_{C2})$.

The duty ratio controller 23 has a function that supplies the switching signals which command ON-OFF-durations of which duty ratio is controlled on the basis of the first control quantity calculated by the proportional-plus-integral unit 12 (hereinafter referred to as a basic operation) as well as a function that supplies the switching signal which commands ON-OFF intervals of which duty ratio is further controlled on the basis of a second control quantity calculated by the proportional-plus-integral unit 22 and supplied to the switching part 6 (hereinafter referred to as balance control operation).

[Operation of Duty Ratio Controller]

<Basic Operation>

The duty ratio controller 23 performs an ON-OFF control of the switches Sw1 to Sw4 to output a converted voltage between OUT1 and OUT2. For example, in boosting (powering mode), the capacitors C1 and C2 are charged by the power supply 2 with accumulation of magnetic energy in the inductor L which generates a current to further charge the capacitors C1 and C2 to output a boosted voltage. In bucking (regeneration mode), when a motor is used as a load on an output side, the duty ratio controller 23 performs a deceleration control (regeneration braking operation) to decrease the voltage on the load side to return a power from the motor toward the power supply 2 which is charged.

Further, in the DC-DC converter 3 shown in FIG. 1, the duty ratio controller 23 controls ON-OFF of the first to fourth switches Sw1 to Sw4 to provide a boost mode (for example, an output voltage one to two times the DC power source voltage E of the power supply 2), a conduction mode (rectifying mode), and a regeneration mode. The operation modes are selected by software or the like. When the DC-DC converter is used in an electric vehicle, twice boosting mode is used for a high speed driving and once boosting mode is used for a low speed driving.

<Balance Control>

A balance control by the duty ratio controller 23 is to decrease the voltage difference between the capacitors C1 and C2 by controlling pulse durations. Thus, in the power supplying system 1 according to the first embodiment, the voltage balance controller 20 of the DC-DC converter 3 controls balance between the voltages $V_{C1}$ and $V_{C2}$ of the capacitors C1 and C2 on the basis of a powering/regenerating discrimination signal generated by the powering/regenerating discriminating part 5.

As shown in FIG. 2, the duty ratio controller 23 determines whether the powering/regenerating discrimination signal is "0" (powering/regenerating discrimination signal=0) in a step ST1. When the powering/regenerating discrimination signal is "0" (Yes in the step ST1), i.e., when the operation state of the electrical rotating machine 200 is powering, the duty ratio controller 23 determines whether the voltages $V_{C1}$ of the first capacitor C1 is greater than the voltage $V_{C2}$ of the second capacitor C2 ($V_{C1}$>$V_{C2}$) (a step ST2). When the voltages $V_{C1}$ is greater than the voltage $V_{C2}$ (Yes in the step ST2), the duty ratio controller 23 expands a pulse duration of the gate waveform of the second switch Sw2 in accordance with the second control quantity (a step ST3a). Further, a pulse duration of the gate waveform of the third switch Sw3 is shortened on the basis of a second control operation (a step ST3b), and the duty ratio controller 23 returns to the step ST1. Here, processes of the steps ST3a and ST3b are performed in an arbitrary order, and may be performed in parallel. Alternatively, either one of the processes may be sufficient. In the following process, this relation between "ST6a, ST7a" and "ST6b, ST7b") is the same.

In the step ST2, when the voltage $V_{C1}$ of the first capacitor C1 is not greater than the voltage $V_{C2}$ (No in a step ST2), the duty ratio controller 23 shortens a pulse duration of the gate waveform of the second switch Sw2 (a step ST4a) on the basis of the second control quantity. Further, the duty ratio controller 23 expands a pulse duration of the gate waveform of the third switch Sw3 on the basis of the second control quantity (a step ST4b). The processing in the duty ratio controller 23 returns to the step ST1. When the voltage $V_{C1}$ of the first capacitor C1 is equal to the voltage $V_{C2}$, the processing in the duty ratio controller 23 returns to the step ST1.

In the step ST1, when the electrical rotating machine 200 is in the regeneration, i.e., the powering/regenerating discrimination signal is "1" (No in the step ST1), the duty ratio controller 23 determines whether the voltage $V_{C1}$ of the first capacitor C1 is greater than the voltage $V_{C2}$ ($V_{C1}$>$V_{C2}$) (step ST5). When the voltage $V_{C1}$ of the first capacitor C1 is greater than the voltage $V_{C2}$ (Yes in the step 5), the duty ratio controller 23 shortens a pulse duration of the gate waveform of the second switch Sw2 according to the second quantity (step ST6a). Further, the duty ratio controller 23 expands a pulse duration of the gate waveform for the third switch Sw3 according to the second quantity (step ST6b). The processing in the duty ratio control part 23 returns to the step ST1.

In the step ST5, when the voltage $V_{C1}$ of the first capacitor C1 is not greater than the voltage $V_{C2}$ (No, in the step ST5), the duty ratio control part 23 expands the pulse duration of the second switch Sw2 according to the second quantity (step ST7a). Further, the duty ratio control part 23 shortens the pulse duration of the gate waveform for the third switch Sw3 (step ST7b), and the processing of the duty ratio control part 23 returns to the step ST1. Further, when the voltage $V_{C1}$ of the first capacitor C1 is equal to the voltage $V_{C2}$, the processing in the duty ratio control part 23 returns to the step ST1.

FIGS. 1 and 2 have been described with an example where the duty ratio control part 23 expands or shortens the pulse duration of the gate waveforms of the second and third switches Sw2 and Sw3. However, as described earlier, the ON-duration of the gate waveform of the first switch Sw1 is equal to the OFF-duration of the gate waveform of the second switch Sw2 and the ON-duration of the gate waveform of the third switch Sw3 is equal to the OFF-duration of the gate waveform of the fourth switch Sw4. Therefore, the powering/regenerating discrimination signal is "1" (No in the step ST1), shortening the pulse duration of the gate waveform for the second switch Sw2 (step ST6a) by the duty ratio control part 23 corresponds to expanding the pulse duration of the gate waveform for the second switch Sw2 by the duty ratio control part 23. Further, expanding the pulse duration of gate waveform for the third switch Sw3 by the duty ratio control part 23 corresponds to shortening the pulse duration of the gate waveform for the fourth switch Sw4 by the duty ratio control part 23. Other cases are similarly considered.

In the flowchart in FIG. 2, both pulse duration of the gate waveform for the second switch Sw2 and the pulse duration of the gate waveform for the third switch Sw3 are varied. However, it is also possible to vary either one. For example, it is also possible to perform either of steps ST3a or ST3b. If it is assumed that only the step ST3a is performed, out of steps ST4a and ST4b only the step ST4a may be performed correspondingly. In the regeneration mode, the flowchart is similarly modified.

Figure 3A:
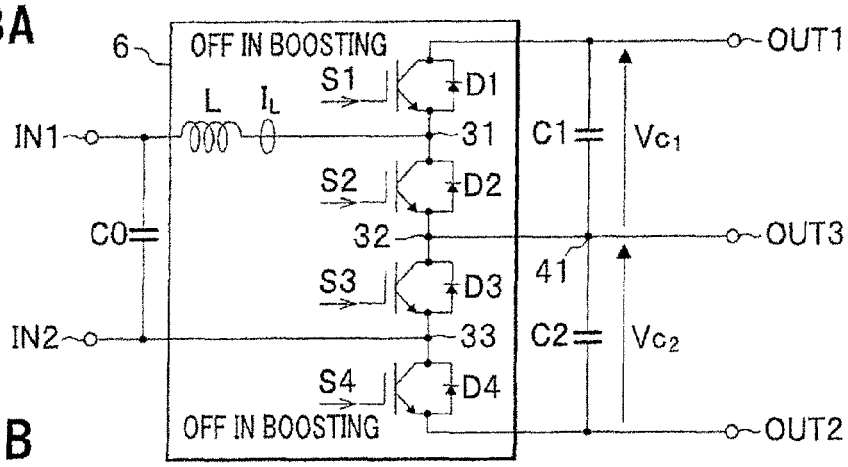
FIG. 3A is a circuit diagram of a switching part shown in FIG. 1 in boosting.
Figure 3B:
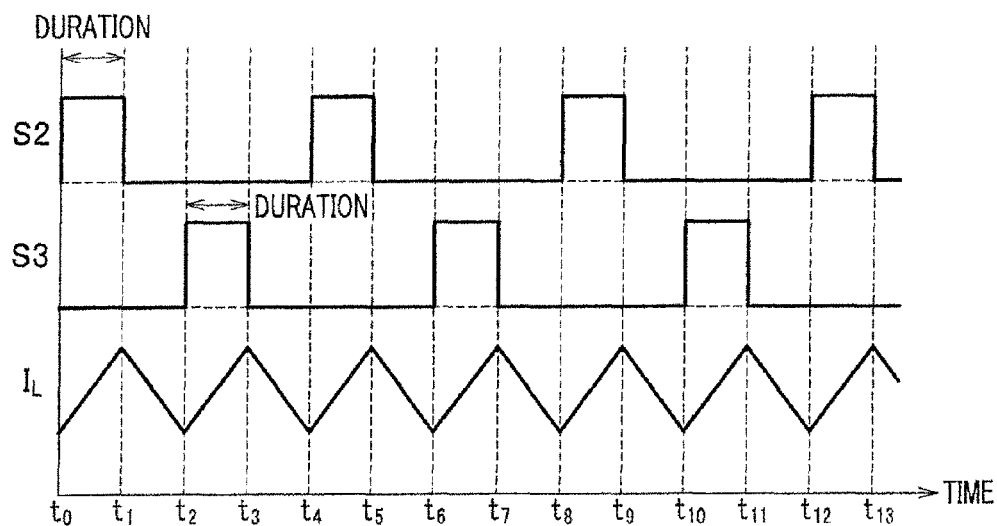
FIG. 3B is a time chart of a standard switching operation.
Figure 3C:
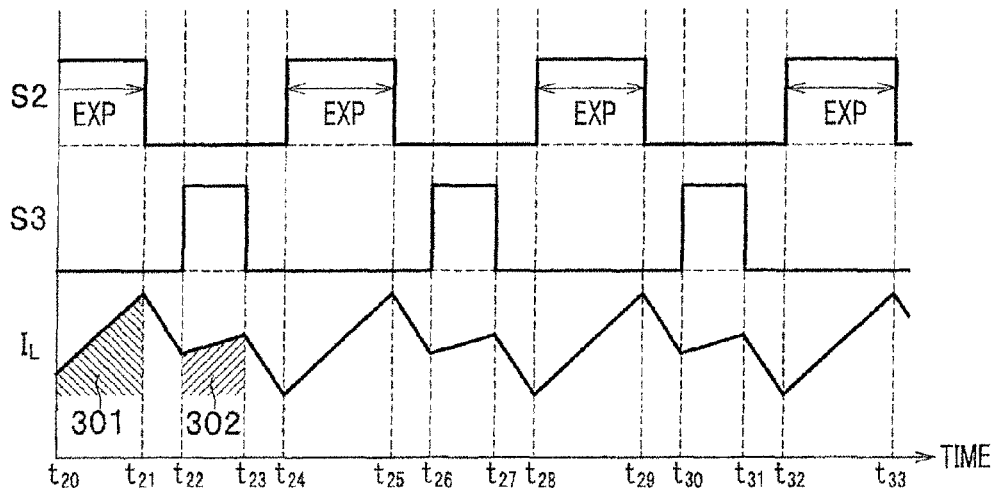
FIG. 3C is a time chart of a switching operation with balance control.

With reference to FIGS. 3A to 3C will be described an example of a booting operation.

<Example of Basic Operation of Boosting>

Gate signals (switching signals) supplied to the switches Sw1 to Sw4 in the switching part 6 by the control circuit part 7 are as follows:

As shown in FIG. 3A, a gate signal S1 supplied to the first switch Sw1 in the switching part 6 is always off in boosting. Similarly, a gate signal S4 supplied to the fourth switch Sw4 in the switching part 6 is also always off in boosting. As a modified example of the operation in which these switches are always off, it is also possible to operate these switches in inverting operation, i.e., when the switch Sw1 is on, the switch Sw2 is off and when the switch Sw4 is on, the switch Sw3 is off.

On the other hand, gate signals S2 and S3 for the second and third switches Sw2 and Sw3 have durations (pulse durations) as shown in FIG. 3B. The gate signals S2 and S3 switch on and off the switches Sw2 and Sw3. Duty ratios of the gate signals S2 and S3 are, for example, 25%, but may be any values not greater than 50% to boost the input voltage up to a voltage one to two times the input voltage.

With reference to FIGS. 3A and 3B will be described a charging operation of the second capacitor C2. The charging operation is similar to that in the case of the inversion operation where when the switch Sw1 is on, the switch Sw2 is off and when the switch Sw4 is on, the switch Sw3 is off.

From timing $t_0$ to $t_1$, a H pulse is supplied on the gate signal S2 to the second switch Sw2 to switch on the switch Sw2 and other switches Sw1, Sw3, and Sw4 are in off states. Accordingly a current charging the second capacitor C2 by the DC power source voltage E is Rout 1 as follows:

Rout 1

The Rout 1 is from the power source 2, via the positive side input terminal IN1, the inductor L, the junction 31, the second switch Sw2, the junction 32, the junction 41, the second capacitor C2, the diode D4, the junction 33, and the negative side input terminal IN2, to the power source 2 in this order. In this state, a magnetic energy is accumulated in the inductor L as the coil current $I_L$ flows through the inductor L and increases in magnitude as shown in FIG. 3B.

Next, from timing $t_1$ to $t_2$ the gate signal S2 becomes LOW, the second switch Sw2 switches off. Accordingly the inductor L releases the magnetic energy as a current flowing through Rout 2 as follows:

Rout 2

The Rout 2 is from the inductor L, via the junction 31, the diode D1, the first capacitor C1, the junction 41, the second capacitor C2, the diode D4, the junction 33, and the negative side input terminal IN2, to the power source 2 in this order.

With reference FIGS. 3A and 3B will be described a charging operation of the first capacitor C1.

From timing $t_2$ to $t_3$, a H pulse is supplied on the gate signal S3 to the third switch Sw3 to switch on the switch Sw3 and other switches Sw1, Sw2, and Sw4 are in off states. Accordingly a current charging the first capacitor C1 by the DC power source voltage E is Rout 3 as follows:

Rout 3

The Rout 3 is from the power source 2, via the positive side input terminal IN1, the inductor L, the junction 31, the diode D1, the first capacitor C1, the junction 41, the junction 32, the third switch Sw3, and the negative side input terminal IN2, to the power source 2 in this order. In this state, a magnetic energy is accumulated in the inductor L as the coil current $I_L$ flows through the inductor L and increases in magnitude as shown in FIG. 3B.

Next, from timing $t_3$ to $t_4$ the gate signal S3 becomes LOW, the third switch Sw3 also switches off. Accordingly the inductor L releases the magnetic energy as a current flowing through Rout 2 mentioned above. As mentioned above, the second capacitor C2 is charged by the current flowing along the Rout 1 and the first capacitor C1 is charged by the current flowing through the Rout 3 from the power source 2. Further, the magnetic energy accumulated in the inductor L during charging periods are released as the current flowing from the inductor L through the Rout 2. Accordingly, the boosting operation can be provided using the first and second capacitors C1 and C2 connected in series.

The DC-DC converter 3 has, in addition to the boosting mode, the conduction mode (rectifying mode) as mentioned earlier. In the conduction mode, the first to fourth switches Sw1 to Sw4 are always switched off. In this state, a current flows through Rout 4 as follows:

Rout 4

The Rout 4 is from the power source 2, via the positive side input terminal IN1, the inductor L, the junction 31, the diode D1, the positive side output terminal OUT1, the electrical rotating machine 200 (see FIG. 1), the negative side output terminal OUT2, the diode D4, the junction 33, and the negative side input terminal IN2 to the power source 2 in this order. In this mode, the first and second capacitors C1 and C2 do not contribute to boosting and thus, the boosting rate is about one.

<Example of Balance Controlling in Boosting>

When the mode is boosting, the operation state of the electrical rotating machine 200 is powering. Here, it is assumed that the voltage $V_{C1}$ of the first capacitor C1 is greater than the voltage $V_{C2}$ of the second capacitor C2 ($V_{C1} > V_{C2}$). In this case, a quantity of charging for the second capacitor C2 is made greater than that for the first capacitor C1. For example, regarding the gate signals S2 and S3 for the second and third switches Sw2 and Sw3, the pulse duration of the gate signal S2 is expanded without variation of the pulse duration of the gate signal S3. This corresponds to the process in which only the step ST3a shown in FIG. 2 is performed.

Variation in the waveforms of the gate signals in this case is shown in FIG. 3C. A period between timing $t_{20}$ to $t_{33}$ shown in FIG. 3C corresponds to a period between timing $t_0$ to $t_{13}$ shown in FIG. 3B. In this operation, because the gate signal S3 is not changed, a waveform of the gate signal S3 between timing $t_{22}$ to $t_{23}$ agrees with that between timings $t_2$ to $t_3$. Similarly, a waveform of the gate signal S3 between timings $t_{26}$ to $t_{27}$, and $t_{30}$ to $t_{31}$ agrees with that between timings $t_6$ to $t_7$, and $t_{10}$ to $t_{11}$. On the other hand, because the pulse duration of the gate signal S2 is expanded, for example, the pulse duration between timings $t_{20}$ to $t_{21}$ is longer than that between timings $t_0$ to $t_1$. Further, the pulse duration between timings $t_{24}$ to $t_{25}$ is longer than that between timings $t_4$ to $t_5$. Similarly, the pulse durations between timings $t_{28}$ to $t_{29}$ and between timings $t_{32}$ to $t_{33}$ are expanded. This means that the pulse duration of the gate signal S2 is longer than the pulse duration of the gate signal S3. In other words, the ON-duration of the second switch Sw2 is longer than that of the third switch Sw3. As a result, the quantity of charging the second capacitor C2 is greater than that of the first capacitor C1.

This difference in charging is shown on a waveform of the coil current $I_L$ on FIG. 3C in areas below the pulse durations indicating integration of the coil current $I_L$. For example, a trapezoid 301 shown by hatching between timings $t_{20}$ to $t_{21}$ corresponding to the pulse duration of the gate signal S2 expanded has a larger area than a trapezoid 302 shown by hatching between timings $t_{22}$ to $t_{23}$ corresponding to the pulse duration of the gate signal S3.

Note that because ON-durations of the second switch Sw2 are expanded at the same cycle, OFF-durations become relatively short. However, other switches Sw1, Sw3, and Sw4 are OFF—during the OFF-duration of the second switch Sw2. Therefore, shortened OFF-duration of the switches Sw1, Sw2, Sw3, and Sw4 means that a duration for which both capacitors C1 and C2 are simultaneously charged is shortened and that the quantities of charging the capacitors C1 and C2 are not different from each other for the duration. In other words, the OFF-duration of the second switch Sw2 does not influence and impede balance control.

[Example of Bucking Operation]

Figure 4A:
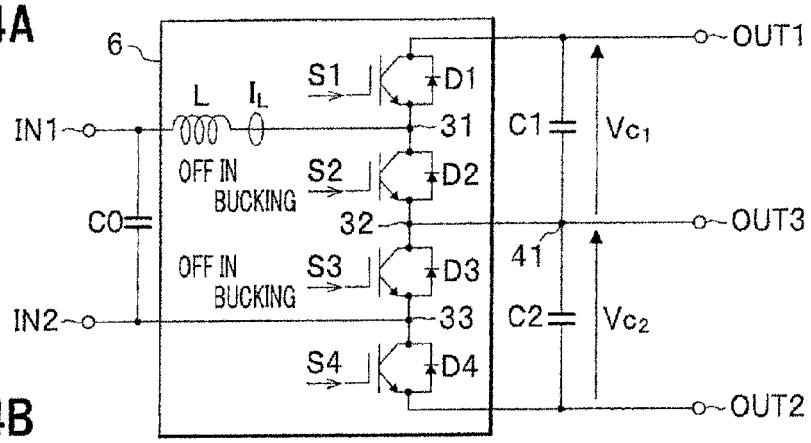
FIG. 4A is a circuit diagram of a switching part shown in FIG. 1 in bucking.
Figure 4B:
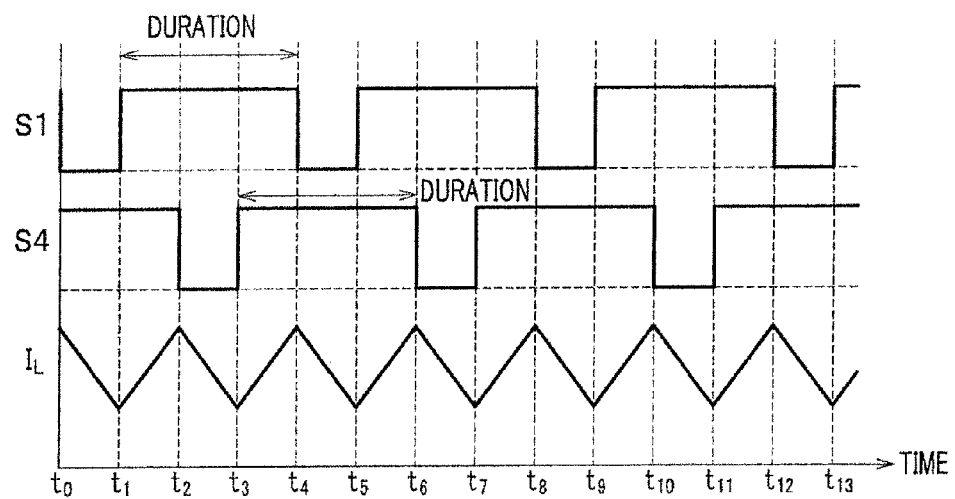
FIG. 4B is a time chart of a standard bucking switching operation.
Figure 4C:
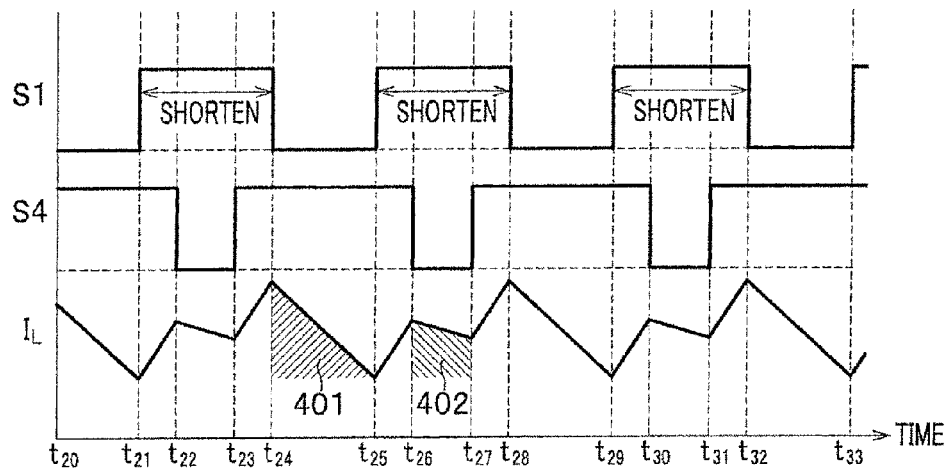
FIG. 4C is a time chart of a bucking switching operation with balance control.

With reference to FIGS. 4A to 4C will be described an example of bucking operation.

<Example of Basic Operation in Bucking>

Gate signals (switching signals) supplied to the switches Sw1 to Sw4 in the switching part 6 by the control circuit part 7 are as follows:

As shown in FIG. 4A, the gate signal S2 supplied to the second switch Sw2 in the switching part 6 is always off in bucking. Similarly, the gate signal S3 supplied to the third switch Sw3 in the switching part 6 is also always off in bucking. As a modified example of the operation in which these switches are always off, it is also possible to operate these switches in inverting operation, i.e., when the switch Sw2 is on, the switch Sw1 is off and when the switch Sw4 is on, the switch Sw3 is off.

On the other hand, the gate signals 51 and S4 for the first and fourth switches Sw1 and Sw4 have durations (pulse durations) as shown in FIG. 4B, and the switches Sw1 and Sw4 are switched on and off in accordance with the gate signals 51 and S4. Duty ratios of the gate signals 51 and S4 are, for example, 75% (100%-25% of the pulse durations of the gate signals S2 and S3), but may be any value.

With reference to FIGS. 4A and 4B will be described a discharging operation of the first and second capacitors C1 and C2 to discharge regeneration charge accumulated in the first and second capacitors C1 and C2 by switching the first and fourth switches Sw1 and Sw4 on. The charging operation is similar to the case of the inversion operation where when the switch Sw1 is on, the switch Sw2 is off and when the switch Sw4 is on, the switch Sw3 is off.

From timing $t_1$ to $t_2$, H pulses are supplied on the gate signals S1 and S4 to the first switch Sw1 and the fourth switch Sw4 and other switches Sw2, and Sw3 are in off states. Accordingly charges in the first and second capacitors C1 and C2 are discharged through Rout 5 as follows:

Rout 5

The Rout 5 is from the first and second capacitors C1 and C2, via the first switch Sw1, the junction 31, the inductor L, the positive side input terminal IN1, the power source 2 (see FIG. 1), the negative side input terminal IN2, the junction 33, and the fourth switch Sw4, to the first and second capacitors C1 and C2 in this order. During this operation, a load in the power source 2 (see FIG. 1) is charged by the first and second capacitors C1 and C2 as well as a magnetic energy is accumulated in the inductor L.

Next, from timing $t_2$ to $t_3$ the gate signal S4 becomes low, and thus the fourth switch Sw4 switches off. During this operation, the second and third switches Sw2 and Sw3 switch off, but the first switch Sw1 remains on. When the fourth switch Sw4 switches off, the inductor L releases the magnetic energy as a current flowing through Rout 6 as follows: Rout 6

The Rout 6 is from the inductor L, via the positive side input terminal IN1, the power source 2 (see FIG. 1), the negative side terminal IN2, the junction 33, the diode D3, the junction 32, the junction 41, the first capacitor C1, the first switch Sw1, and the junction 31, to the inductor L in this order. Note that because the first switch Sw1 is on, and thus the first capacitor C1 is in a discharging state to discharge the accumulated magnetic energy, although the current by the magnetic energy accumulated by the inductor L flows, the first capacitor C1 is not charged.

Next, from timing $t_3$ to $t_4$ the gate signal S4 becomes H, and thus the fourth switch Sw4 switches on. Accordingly the current discharged by the first and second capacitors C1 and C2 flows through Rout 5, and thus the load in the power source 2 (see FIG. 1) is charged by the capacitors C1 and C2 and a magnetic energy is accumulated in the inductor L.

Next, from timing $t_4$ to $t_5$, a L level is supplied on the gate signal S1 to the first switch Sw1, and thus the switch Sw1 switches off. During this operation, the second and third switches Sw2 and Sw3 switch off, but the fourth switch Sw4 remains on. When the first switch Sw1 is switched off, the inductor L releases the magnetic energy as a current flowing through Rout 7 as follows:
Rout 7

The Rout 7 is from the inductor L, via the positive side input terminal IN1, the power source 2 (see FIG. 1), the negative side terminal IN2, the junction 33, the fourth switch Sw4, the second capacitor C2, and the junction 41, the junction 32, the diode D2, the junction 31, to the inductor L in this order. Note that because the fourth switch Sw4 is on, and thus the second capacitor C2 is in a discharging state to discharge the accumulated magnetic energy, although the current by the magnetic energy accumulated by the inductor L flows, the second capacitor C2 is not charged. After that, the operation from timings $t_1$ to $t_5$ is periodically repeated. As mentioned above, regeneration power accumulated in the first and second capacitors C1 and C2 is returned to the power source 2 and thus, the voltages of the first and second capacitors C1 and C2 decrease.

<Example of Balance Control in Bucking>

It is assumed that the voltage $V_{C2}$ of the second capacitor C2 is greater than the voltage $V_{C1}$ of the first capacitor C1 ($V_{C1} < V_{C2}$). In this case, a quantity of discharging from the second capacitor C2 is made greater than that from the first capacitor C1. For example, regarding the gate signals S1 and S4 for the first and fourth switches Sw1 and Sw4, the pulse duration of the gate signal S1 is shortened without variation of the pulse duration of the gate signal S4. In other words, a duration of the gate signal S2 is expanded. This corresponds to the process in which only the step ST7a shown in FIG. 2 is performed.

Variation in the waveform of the gate signal in this case is shown in FIG. 4C. A period between timing $t_{20}$ to $t_{33}$ shown in FIG. 4C corresponds to a period between timing $t_0$ to $t_{13}$ shown in FIG. 4B. In this operation, because the gate signal S4 is not changed in duration, a waveform of the gate signal S4 between timing $t_{22}$ to $t_{23}$ agrees with that between timings $t_2$ to $t_3$. Similarly, a waveform of the gate signal S4 between timings $t_{26}$ to $t_{27}$, and $t_{30}$ to $t_{31}$ agrees with that between timings $t_6$ to $t_7$, and $t_{10}$ to $t_{11}$. On the other hand, because the pulse duration of the gate signal S1 is shortened, for example, the pulse duration between timings $t_{20}$ to $t_{21}$ is longer than that between timings $t_0$ to $t_1$. Similarly, the pulse durations between timings $t_{25}$ to $t_{28}$ and between timings $t_{29}$ to $t_{32}$ are shortened. This means that the pulse duration in which only the gate signal S1 is supplied is shorter than the pulse duration in which only the gate signal S4 is supplied. In other words, the ON-duration of the first switch Sw1 is longer than that of the fourth switch Sw4. As a result, the quantity of discharging the first capacitor C1 is smaller than that of the second capacitor C2. In other words, a quantity of discharging from the second capacitor C2 is made greater than that from the first capacitor C1.

This difference in discharging is shown on a waveform of the coil current $I_L$ on FIG. 4C in areas below the OFF-durations indicating integration of the coil current $I_L$. For example, a trapezoid 402 shown by hatching between timings $t_{26}$ to $t_{27}$ corresponding to the pulse duration of the gate signal S4 expanded has a small area than a triangle 401 shown by hatching between timings $t_{24}$ to $t_{25}$ corresponding to the pulse duration of the gate signal S1.

Note that because ON-durations of the first switch Sw1 are shortened at the same duty cycle, OFF-durations become relatively longer. However, while the first switch Sw1 is off, the fourth switch Sw4 switches on. Therefore, a period for which the regeneration charges accumulated in the second capacitor C2 are discharged is expanded. On the other hand, because ON-durations of the fourth switch Sw4 are not changed, the period for which the regeneration charges accumulated in the first capacitor C1 does not vary. Therefore, the shortened OFF-duration of the first switch Sw1 means that a duration for which both capacitors C1 and C2 are simultaneously discharged is shortened and that the quantities of discharging the capacitors C1 and C2 are not different from each other for the duration. In other words, the OFF-duration of the first switch Sw1 does not influence and impede the balance control.

According to the DC-DC converter 3 of the first embodiment has the balance control part 20 for decreasing the voltage difference between the first and second capacitors connected in series by varying duration of the gate signal supplied to the switching part 6. Therefore, if the unbalance in the voltages of the first and second capacitors is detected, the unbalance can be suppressed. Making the balance in voltage between the first and second capacitors C1 and C2 even prevents voltage unbalance caused by a larger quantity of current flowing into one capacitor when the balance in voltage between the first and second capacitors C1 and C2 is not even. Because the voltage unbalance is prevented, dispersion in deterioration of the switching elements caused by the voltage unbalance can be minimized, so that a durability of the DC-DC converter 3 can be improved. Further, because dispersion in temperature of the switching elements can be suppressed, unbalance in electric loads can be prevented. Further, according to this configuration, a margin in voltage withstanding design in consideration of the unbalance conventionally required can be eliminated.

Further, according to the power supplying system 1 of the first embodiment, because the voltage balance control part 20 of the DC-DC converter 3 decreases the voltage difference between the first and second capacitors C1 and C2 on the basis of the powering/regenerating discrimination signal, so that the quantity of charging is controlled while the electrical rotating machine 200 is powering and the quantity of discharging is controlled while the electrical rotating machine 200 is regenerating.

Second Embodiment of Power Supplying System

Figure 5:
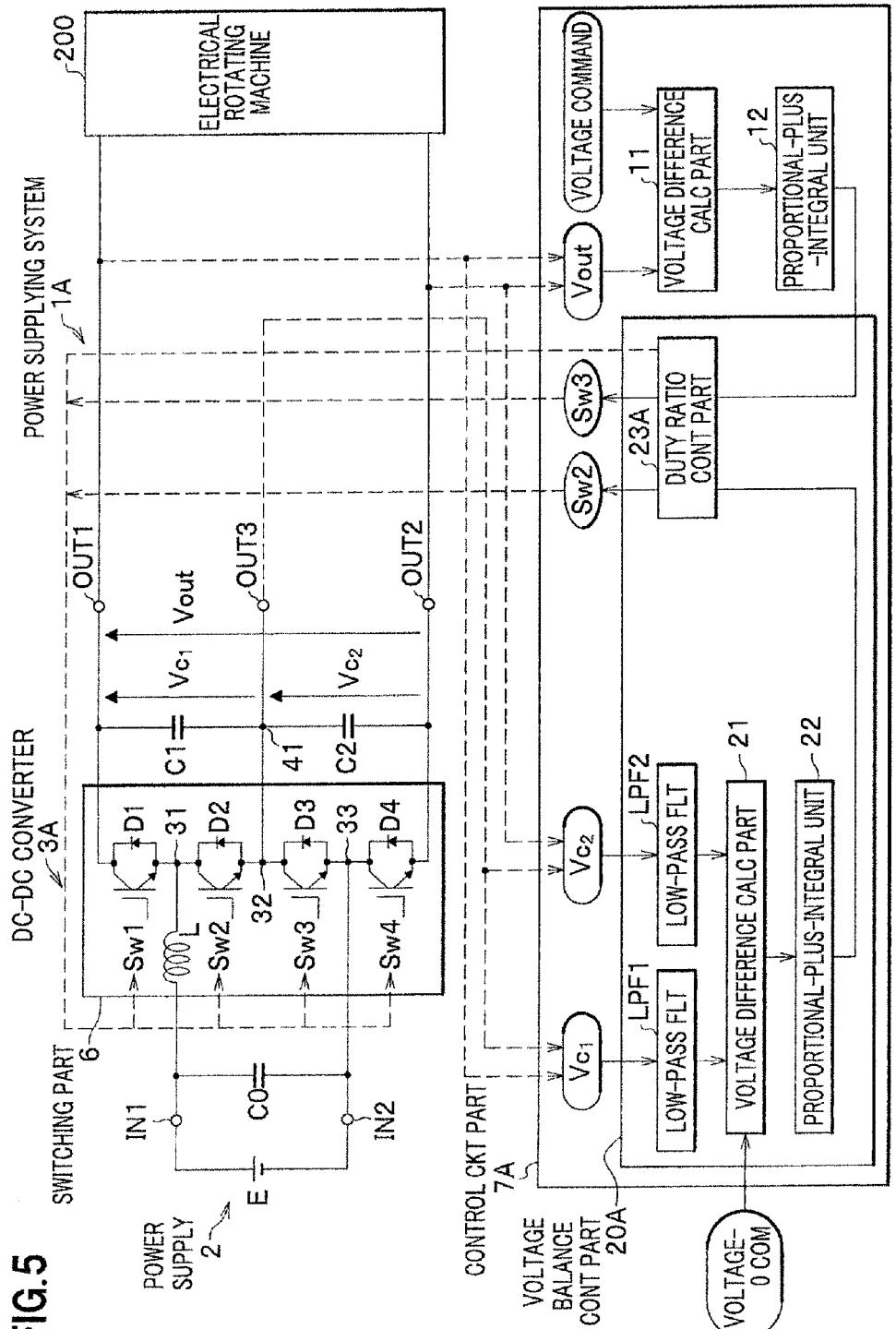
FIG. 5 is a block diagram of a power supplying system including a DC-DC converter according to a second embodiment of the present invention.

As shown in FIG. 5, a power supplying system 1A according to the second embodiment includes a DC-DC converter 3A and the power source 2 without the configuration for discriminating whether the DC-DC converter 3A is in either of boosting or bucking. The same configuration of the power supplying system 1 and the DC-DC converter 3 according to the second embodiment as those according to the first embodiment are designated with the same references and thus, a duplicated deception will be omitted.

The DC-DC converter 3A according to the second embodiment is similar to the DC-DC converter 3 shown in FIG. 1 except the control circuit part 7A which is provided for a second duty ratio control. In the second embodiment, the control circuit part 7A controls a phase of a pulse to decrease the difference between the voltage $V_{C1}$ and $V_{C2}$ of the first and second capacitors C1 and C2.

Therefore, the control circuit part 7A includes a voltage difference calculating part 11, and the proportional-plus-integral unit 12, and a voltage balance control part 20A. The voltage balance control part 20A includes the first and second low-pass filters LPF1 and LPF2, a voltage difference calculating part 21, the proportional-plus-integral unit 22, a duty ratio control part 23A. The balance control operation by the duty ratio control part 23A decreases the voltage difference between the first and second capacitors by controlling the phase of pulse.

Figure 6:
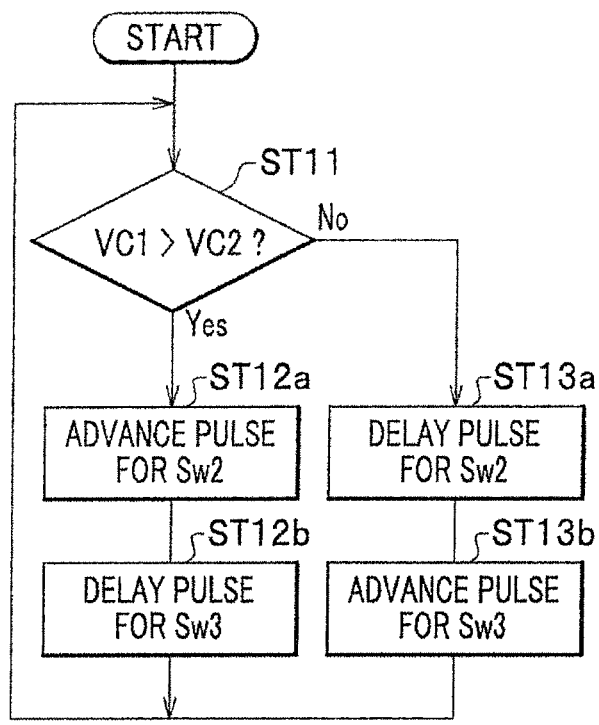
FIG. 6 is a flowchart showing a balance control operation in the DC-DC converter shown in FIG. 5.

As shown in FIG. 6, the duty ratio control part 23A determines whether the voltage $V_{C1}$ of the first capacitor C1 is greater than the voltage $V_{C2}$ of the second capacitor C2 ($V_{C1}$>$V_{C2}$) in a step ST11. When the voltage $V_{C1}$ is greater than the voltage $V_{C2}$ (Yes in a step ST11), the duty ratio control part 23A advances the phase of the pulse on the gate waveform for the second switch Sw2 in accordance with the second operation quantity in a step ST12a from original timing (standard timing) within the same duty cycle. Further, the duty ratio control part 23A delays the phase of the pulse on the gate waveform for the third switch Sw3 in a step ST12b from original timing (standard timing). The processing returns to the step ST11. Here, processes of the steps ST12a and ST12b are performed in an arbitrary order, and may be performed in parallel. In the following process, a relation between "ST13a" and "ST13b" is similar.

In the step ST11, when the voltage $V_{C1}$ is not greater than the voltage $V_{C2}$ (No, in a step ST11), the duty ratio control part 23A delays the phase of pulse on the gate signal for the second switch Sw2 in accordance with the second quantity in a step ST13a from original timing (standard timing). Further, the duty ratio control part 23A advances a phase of a pulse on the gate waveform for the third switch Sw3 in accordance with the second control quantity in a step ST13b from original timing (standard timing). Next, the processing in the duty ratio control part 23 returns to step ST11. The duty ratio control part 23A returns to the step ST11 when the voltage $V_{C1}$ is equal to the voltage $V_{C2}$.

In FIGS. 5 and 6, an example is described with assumption that the duty ratio control part 23A advances (or delays) phases of the pulses on the gate waveforms of the second and third switches Sw2 and Sw3 from original timing. However, as described earlier, an ON-duration of the gate waveform of the first switch Sw1 is equal to an OFF-duration of the gate waveform of the second switch Sw2, and an ON-duration of the gate waveform of the third switch Sw3 is equal to an OFF-duration of the gate waveform of the fourth switch Sw4. Accordingly, advancing a phase of pulse on the gate waveform of, for example, the second switch Sw2 from original timing by the duty ratio control part 23A (step ST12a) corresponds to advancing a phase of pulse on the gate waveform of the first switch Sw1 from original timing by the same value. Further, delaying a phase of pulse on the gate waveform of, for example, the third switch Sw3 from original timing by the duty ratio control part 23A (step ST12b) corresponds to delaying a phase of pulse on the gate waveform of the fourth switch Sw4 from original timing by the same value. Others are the same.

Further, in the flowchart in FIG. 6, both the phase of the pulse on the gate waveform for the second switch Sw2 and the phase of the pulse on the gate waveform for the third switch Sw3 are shifted. However, either of the phase of the pulse on the gate waveform for the second switch Sw2 and the phase of the pulse on the gate waveform for the third switch Sw3 may be varied. More specifically, either of the step ST12a or ST12b may be done. If it is assumed that only the step ST12a is done, only the step ST13a is done when No is determined in the step ST11.

[Example of Operation in Boosting]

Figure 7A:
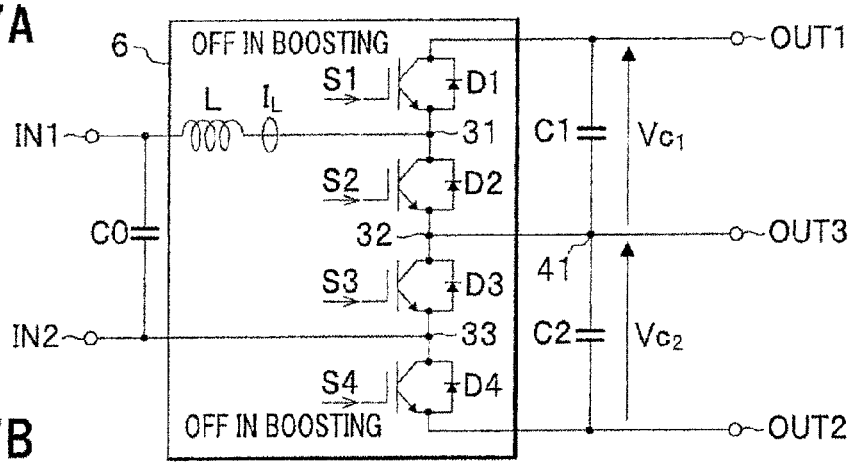
FIG. 7A is a circuit diagram of a switching part shown in FIG. 5 in boosting.
Figure 7B:
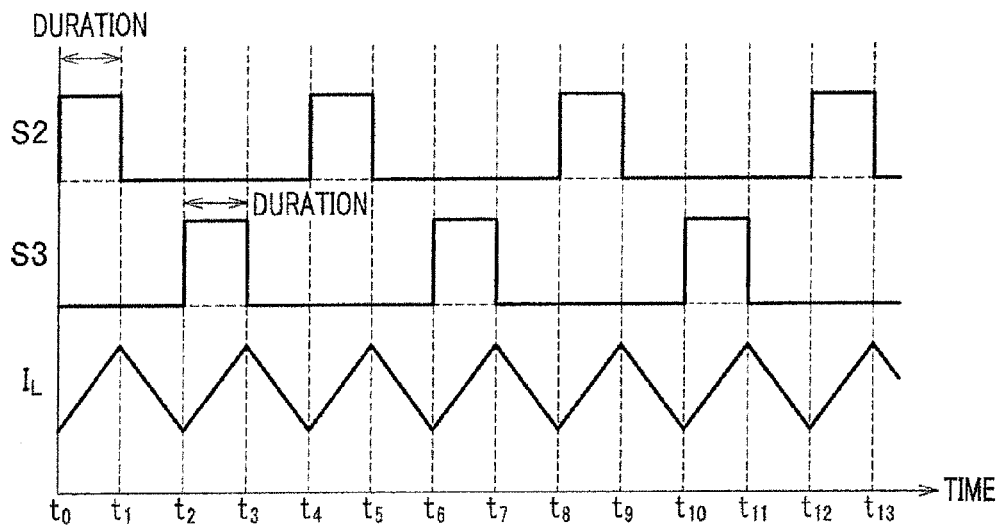
FIG. 7B is a time chart of a standard boosting switching operation.
Figure 7C:
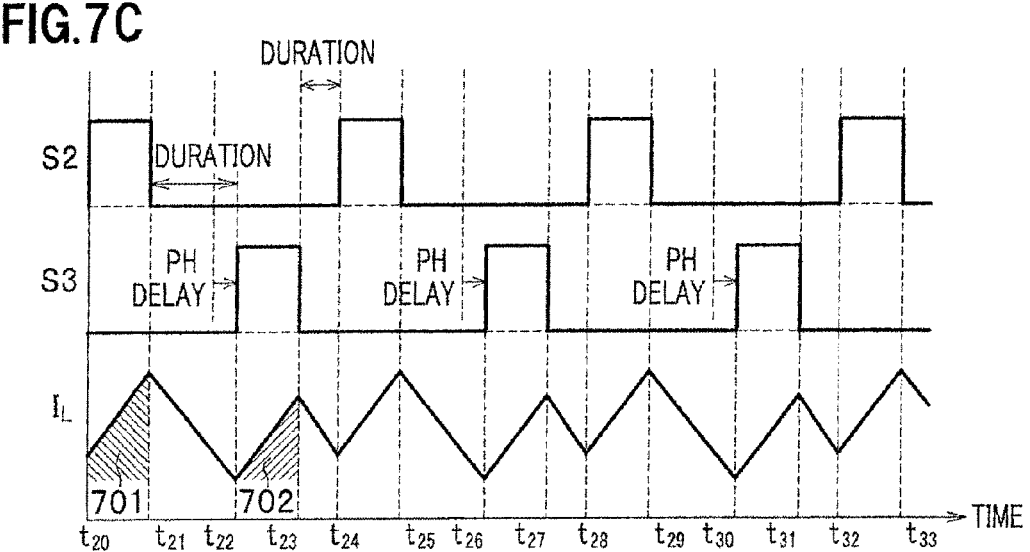
FIG. 7C is a time chart of a boosting switching operation with balance control.

With reference to FIGS. 7A to 7C will be described an example of operation in boosting.

<Example of Basic Operation in Boosting>

As shown in FIGS. 7A and 7B, the gate signals (switching signal) supplied to the switching part 6 by the control circuit part 7A, and the charging operation for the first and second capacitors Ca and C2 are the same as those described with reference to FIGS. 3A and 3B, and thus a duplicated description will be omitted.

<Example of Balance Control Operation>

In boosting, the operation state of the electrical rotating machine 200 is powering. Here, it is assumed that the voltage $V_{C1}$ of the first capacitor C1 is greater than the voltage $V_{C2}$ of the second capacitor C2 ($V_{C1}$>$V_{C2}$). In this case, a quantity of charging for the second capacitor C2 is made greater than that for the first capacitor C1. For example, regarding the gate signals S2 and S3 for the second and third switches Sw2 and Sw3, the pulse phase of the gate signal S3 is delayed without shift of the pulse phase of the gate signal S2. This corresponds to the process in which only the step ST12b shown in FIG. 6 is performed.

Variation in the waveforms of the gate signals in this case is shown in FIG. 7C. A period between timing $t_{20}$ to $t_{33}$ shown in FIG. 7C corresponds to a period between timing $t_0$ to $t_{13}$ shown in FIG. 7B. ON-durations of the gate signal S2 shown in FIG. 7C, i.e., between timing $t_{20}$ to $t_{21}$, timing $t_{24}$ to $t_{25}$, timing $t_{28}$ to $t_{29}$, timing $t_{32}$ to $t_{33}$ correspond to ON-durations of the gate signal S2 shown in FIG. 7B, i.e., between timing $t_0$ to $t_1$, timing $t_4$ to $t_5$, timing $t_8$ to $t_9$, timing $t_{12}$ to $t_{13}$, respectively. This means that the gate signal S2 shown in FIG. 7C does not change from that shown in FIG. 7B.

On the other hand, ON-durations of the gate signal S3 shown in FIG. 7C, i.e., between timing $t_{22}$ to $t_{23}$, timing $t_{26}$ to $t_{27}$, and timing $t_{30}$ to $t_{31}$ are delayed from ON-durations of the gate signal S3 shown in FIG. 7B, i.e., between timing $t_2$ to $t_3$, timing $t_6$ to $t_7$, and timing $t_{10}$ to $t_{11}$, respectively. In other words, ON-durations of the gate signal S3 are delayed from the original timing (standard timing).

Because there is no variation in pulse duration, ON-durations of the gate signals S2 and S3 are equal to each other. However, because of phase delay of the ON-duration of the gate signal S3, as shown in FIG. 7C, an absolute value of the coil current $I_L$ corresponding to the ON-duration of the gate signal S2 is greater than an absolute value of the coil current $I_L$ corresponding to the ON-duration of the gate signal S3. Because time product of the current is a quantity of charge and a voltage of a capacitor is proportional to the quantity of the charge, when durations of charging are the same, the capacitor charged by the coil current $I_L$ of which absolute value is greater than the other has a greater capacitor voltage. In other words, the quantity of charge while the gate signal S2 is on becomes greater than that while the gate signal S3 is on. Accordingly, the quantity of charging the second capacitor C2 becomes greater than the quantity of charging the first capacitor C1. Thus, the voltage $V_{C1}$ of the first capacitor C1 decreases, and the voltage $V_{C2}$ of the second capacitor C2 increases. As a result, an intermediate potential (OUT3) of the first and second capacitors C1 and C2 is increased.

A difference in the quantity of charging is shown in a difference in areas below a waveform of the coil current $I_L$ (time integration) in FIG. 7C. For example, an area of a triangle 702 corresponding to the delayed ON-duration of the gate signal S3 shown by hatching during timing $t_{22}$ to $t_{23}$ is smaller than an area of a triangle 701 corresponding to the unchanged ON-duration of the gate signal S2 shown by hatching during timing $t_{20}$ to $t_{21}$.

More specifically, because the ON-durations of the third switch Sw3 are delayed, a duration from when the second switch Sw2 is switched off to when the third switch Sw3 is switched on, for example, from timing t21 to t22 (hereinafter referred to as first all-switch OFF-duration) becomes longer and a duration from when the third switch Sw2 is switched off to when the second switch Sw2 is switched on, for example, from timing t23 to t24 (hereinafter referred to as second all-switches OFF-duration) becomes shorter. Because the first all-switch OFF-duration corresponds to an extended duration between timing $t_1$ to $t_2$ which is expanded, this duration is the duration for which the current released by the inductor L flows through the Rout 2. In addition, because the second all-switch OFF-duration corresponds to a duration between timing $t_3$ to $t_4$ relatively shortened by the same interval, this duration is the duration for which the current released by the inductor L flows through the Rout 2. Therefore, the rout through which the currents flow for the first all-switch OFF-duration are the same as that of the second all-switch OFF-duration, and thus a total duration is unchanged. In these durations, because both first and second capacitors are simultaneously charged in series by the current released by the inductor L, no difference occurs in quantity of charge between the first and second capacitors C1 and C2. In other words, the first and second all-switch OFF-durations neither contribute nor impedes to the balance control. However, the expanded duration from timing t21 to t22 as a result of phase shift more decreases the released current from the inductor L, which decrease the area 702, and the shortened duration from timing t23 to t24 as a result of phase shift less decreases the released current from the inductor L, which increase the area (701) from timing t24 to t25. In other words, the first and second all-switch OFF-durations neither contributes nor impedes to the balance control, but contributes balance control for the succeeding durations from timing t22 to t23 and timing t24 to t25. Therefore, this phase control can be considered as a duty ratio control (first and second all-switch OFF-duration).

[Example of Bucking Operation]

Figure 8A:
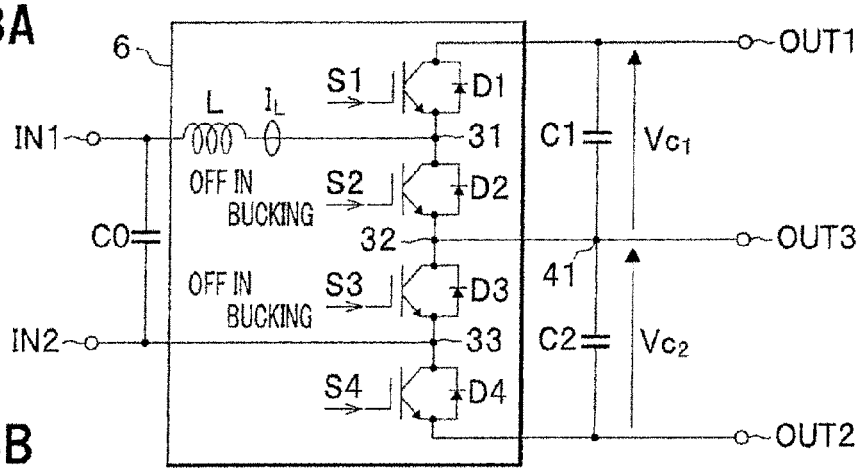
FIG. 8A is a circuit diagram of a switching part shown in FIG. 5 in bucking.
Figure 8B:
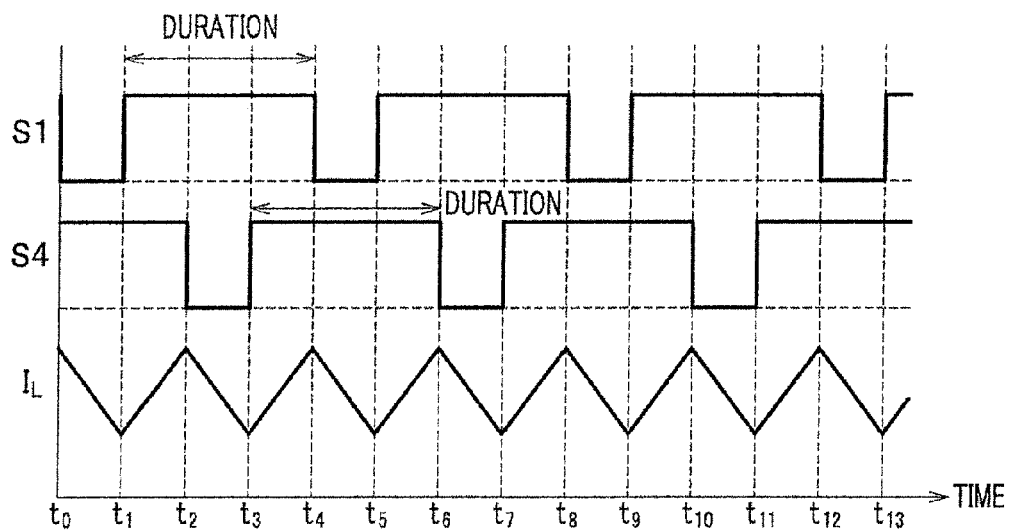
FIG. 8B is a time chart of a standard bucking switching operation.
Figure 8C:
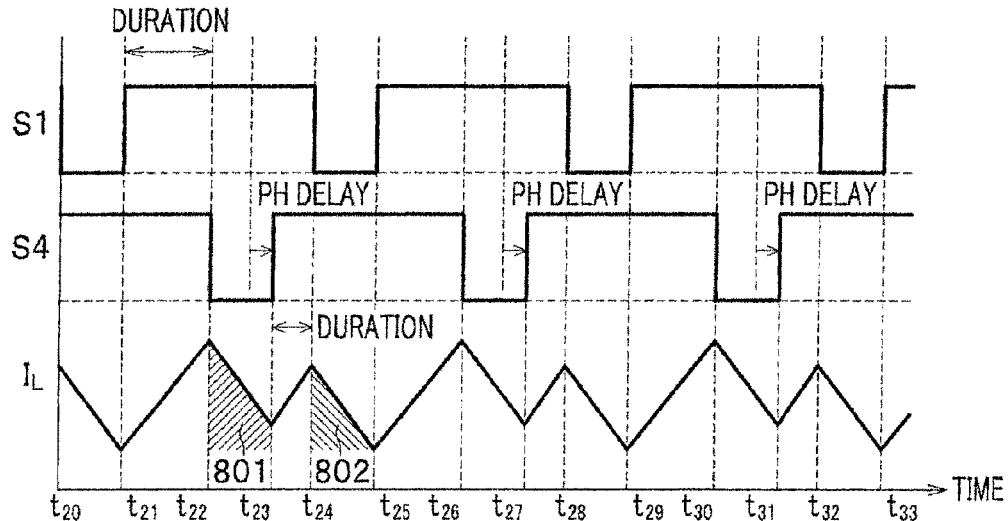
FIG. 8C is a time chart of a bucking switching operation with balance control.

With reference to FIGS. 8A to 8C, will be described an Example of bucking operation.

<Example of Basic Operation in Bucking>

As shown in FIGS. 8A and 8B, the gate signals (switching signals) for respective switches Sw1 to Sw4 supplied to the switching part 6 by the control circuit part 7A and the charging operation of the first and second capacitors C1 and C2 are the same as those described with reference to FIGS. 4A and 4B, and thus a duplicated description will be omitted.

<Example of Balance Control in Bucking>

In bucking, the operation state of the electrical rotating machine 200 is regeneration. Here, it is assumed that the voltage $V_{C1}$ of the first capacitor C1 is greater than the voltage $V_{C2}$ of the second capacitor C2 ($V_{C1}>V_{C2}$). In this case, a quantity of charging for the second capacitor C2 is made greater than that for the first capacitor C1. For example, regarding the gate signals S1 and S4 for the first and fourth switches Sw1 and Sw4, the pulse phase of the gate signal S4 is delayed without variation of the pulse phase of the gate signal S1. In other words, the phase of the pulse of the gate signal S3 is delayed. This corresponds to the process done by only the step ST12b shown in FIG. 6 as similar to the boosting operation.

Variation in the waveforms of the gate signals in this case is shown in FIG. 8C. A period between timing $t_{20}$ to $t_{33}$ shown in FIG. 8C corresponds to a period between timing $t_0$ to $t_{13}$ shown in FIG. 8B. ON-durations of the gate signal S1 shown in FIG. 8C, i.e., between timing $t_{21}$ to $t_{24}$, timing $t_{25}$ to $t_{28}$, and timing $t_{29}$ to $t_{32}$ correspond to ON-durations of the gate signal S1 shown in FIG. 8B, i.e., between timing $t_1$ to $t_4$, timing $t_5$ to $t_8$, and timing $t_9$ to $t_{12}$, respectively. This means that the gate signal S1 does not change.

On the other hand, ON-durations of the gate signal S4 shown in FIG. 8C, i.e., between timing $t_{23}$ to $t_{26}$, and timing $t_{27}$ to $t_{30}$ are delayed to ON-durations of the gate signal S4 shown in FIG. 8B, i.e., between timing $t_3$ to $t_6$, and timing $t_7$ to $t_{10}$ by a predetermined time interval, respectively. In other words, ON-durations of the gate signal S4 are delayed from the original timing.

Because there is no variation in pulse duration, ON-durations of the gate signals S1 and S4 are equal to each other. However, because of phase delay of the ON-duration of the gate signal S4, as shown in FIG. 8C, an absolute value of the coil current $I_L$ corresponding to the OFF-duration of the gate signal S4 is greater than an absolute value of the coil current $I_L$ corresponding to the OFF-duration of the gate signal S1. In this case, the quantity of discharge while the gate signal S4 is off becomes greater than that while the gate signal S1 is off. Accordingly, the quantity of discharging the first capacitor C1 becomes greater than the quantity of discharging the second capacitor C1. Thus, the voltage $V_{C1}$ of the first capacitor C1 decreases, and the voltage $V_{C2}$ of the second capacitor C2 increases. As a result, the intermediate potential (OUT3) of the first and second capacitors C1 and C2 is increased.

A difference in the quantity of discharging is shown in a difference in areas below a waveform of the coil current $I_L$ (time integration) in FIG. 8C. For example, an area of a trapezoid 801 corresponding to the delayed OFF-duration of the gate signal S4 shown by hatching during timing $t_{22}$ to $t_{23}$ is greater than an area of a triangle 802 corresponding to the unchanged OFF-duration of the gate signal S1 shown by hatching during timing $t_{24}$ to $t_{25}$. Delay of ON-duration of the fourth switch Sw4 neither contributes nor impedes to the balance control.

The DC-DC converter 3A according to the second embodiment is provided with the voltage balance control part 20A configured to shift the pulse phase of the gate signal (the switching signal) supplied to the switching part 6 to decrease the voltage difference between the first and second capacitors C1 and C2 connected in series. Thus although there may be a case where balance of the first and second capacitors C1 and C2 becomes uneven, unbalance can be suppressed.

Further, in the power supplying system 1A according to the second embodiment, the voltage balance control part 20A of the DC-DC converter 3 can decrease the voltage difference between the first and second capacitors C1 and C2 without change of the capacitor of which the quantity of charging or discharging is controlled in accordance with the operation state of the electrical rotating machine 200.

Third Embodiment of Power Supplying System

Figure 9:
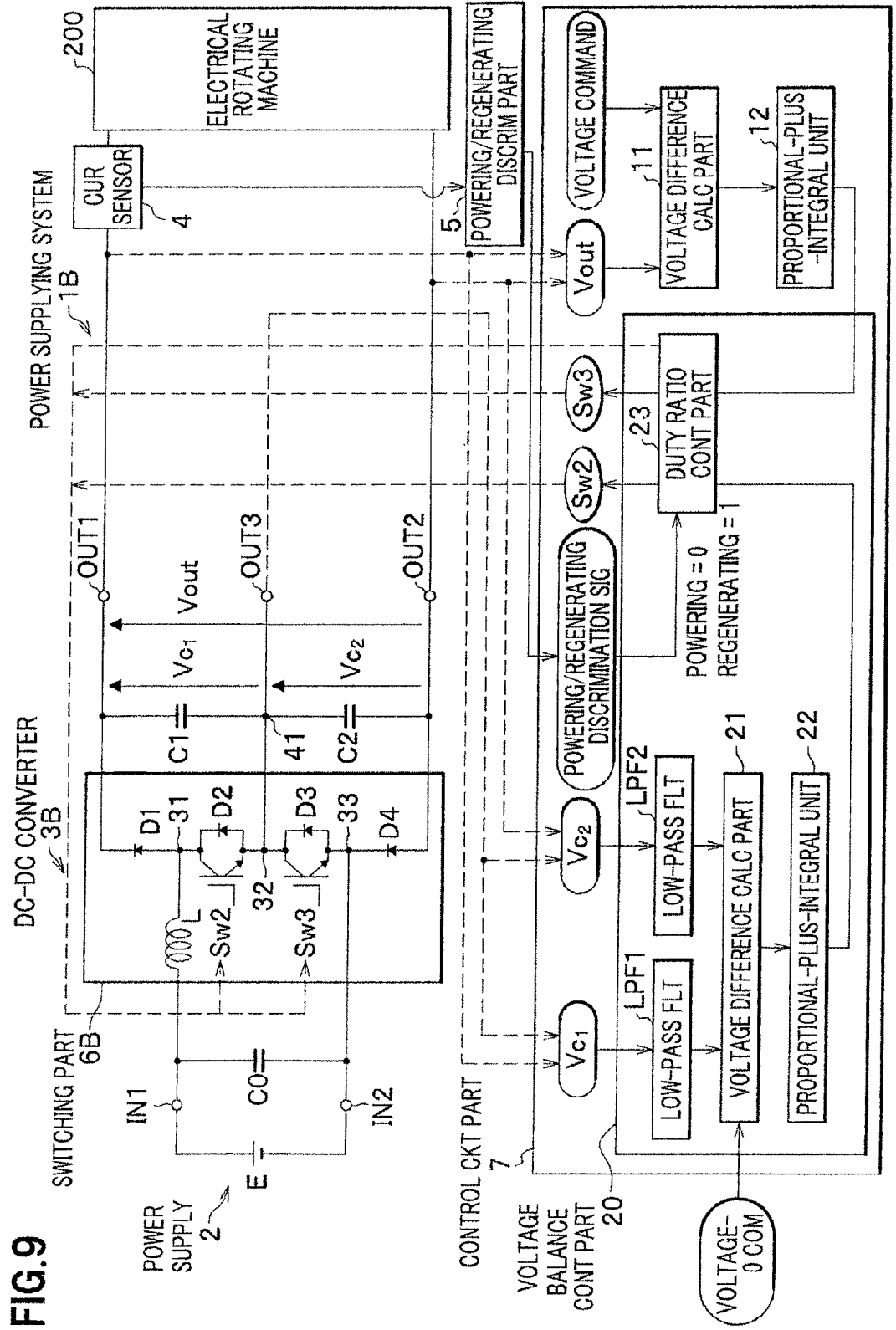
FIG. 9 is a block diagram of a power supplying system including a DC-DC converter according to a third embodiment of the present invention.

As shown in FIG. 9, a power supplying system 1B according to a third embodiment has substantially the same configuration as the power supplying system 1 except in having a DC-DC converter 3B according to the third embodiment. Hereinafter, the same reference numerals as the power supplying system 1 and the DC-DC converter 3 according to the first embodiment are designated with the same reference numerals and thus, a duplicated description will be omitted. The DC-DC converter 3B is the same as the DC-DC converter 3 shown in FIG. 1 except that the switching part 6B has different configuration. In the switching part 6B, the switches Sw1 and Sw4 in FIG. 1 are replaced with general types of diodes D1 and D4.

More specifically, the switching part 6B includes a diode D1, a switch Sw2 comprising an IGBT, and a diode D2 connected in parallel to the IGBT, a switch Sw3 comprising an IGBT, and a diode D3 connected in parallel to the IGBT, and a diode D4 to switch connection between the DC power input-output circuit and the first and second capacitors C1 and C2. In the DC-DC converter 3B according to the third embodiment, the switches Sw2 and Sw3 are referred to as a first switch Sw2 and a second switch Sw3, respectively. Further, the diodes D1 and D4 are referred to as first and second diodes D1 and D4.

The first diode D1 connects the positive side input terminal IN1 to a positive terminal of the first capacitor C1 and the positive side output terminal OUT1.

The first switch Sw2 connects the positive side input terminal IN1 to the negative terminal of the first capacitor C1 and the positive terminal of the second capacitor C2.

The second switch Sw3 connects the negative side input terminal IN2 to the negative terminal of the first capacitor C1 and the positive terminal of the second capacitor in an on-state thereof.

The second diode D4 provides connection between the negative side input terminal IN2 and the negative terminal of the second capacitor C2 and to the negative side of the output terminal OUT2.

The DC-DC converter 3B according to the third embodiment provides a similar operation as the DC-DC converter according to the first embodiment, and the number of switches can be decreased using the switching operation (rectifying operation) of the diode which results in decrease in a manufacturing cost. Further, the power supplying system 1B according to the third embodiment provides the same operation and advantageous effect as the power supplying system according to the first embodiment.

Fourth embodiment of power generating system

Figure 10:
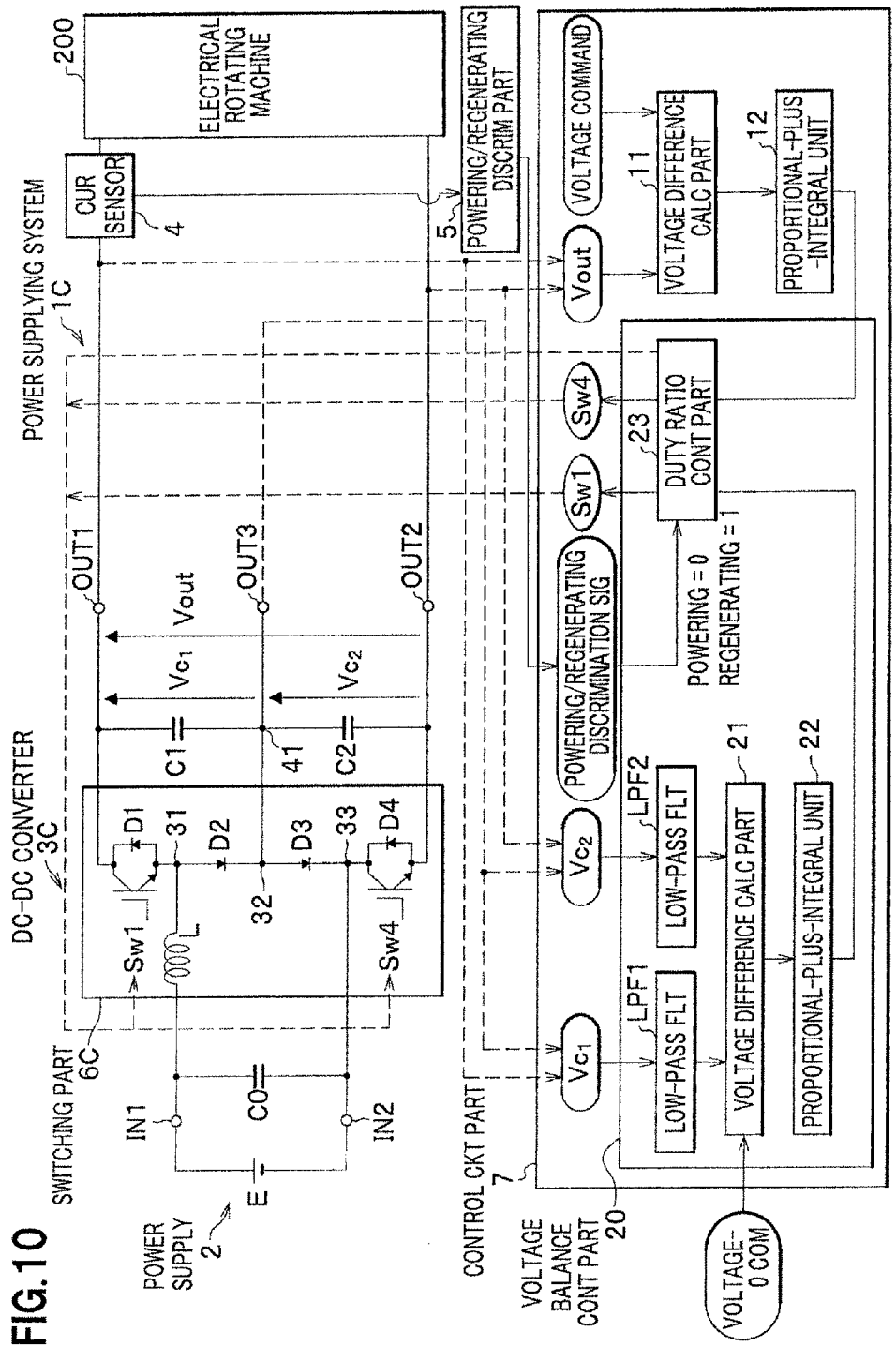
FIG. 10 is a block diagram of a power supplying system including a DC-DC converter according to a fourth embodiment of the present invention.

As shown in FIG. 10, a power supplying system according to a fourth embodiment is similar to that shown in FIG. 1 except in having the DC-DC converter 3C according to the fourth embodiment. Hereinafter, the same configuration as the DC-DC converter 3 according to the power supplying system 1 are designated with the same reference numerals, and thus a duplicated description will be omitted. The DC-DC converter 3C has the same configuration as the DC-DC converter 3 shown in FIG. 1 except that the switching part 6C has a different configuration. In the switching part 6C, the switches Sw2 and Sw3 are replaced with general diodes D2 and D3, respectively.

More specially, the switching part 6C includes, for example, the switch Sw1 with diode D1 connected in parallel to the switch Sw1 and diodes D2 and D3, the switch Sw4 and a diode D4 connected in parallel to the switch Sw4 and switches connection between the power supply input part and the capacitors C1 and C2. In the DC-DC converter 3C according to the fourth embodiment, the switches Sw1 and Sw4 in the switching part 6C are referred to as first and second switches Sw1 and Sw4. Further, the diodes D2 and D3 are referred to as a first diode D2 and a second diode D3, respectively.

The first switch Sw1 connects the positive side input terminal IN1 to the positive terminal of the first capacitor C1 and the positive side output terminal OUT1.

The first diode D2 connects the positive side input terminal IN1 to the negative terminal of the first capacitor C1 and the positive terminal of the second capacitor C2.

The second diode D3 provides connection between the negative side input terminal IN2 and the negative terminal of the first capacitor C1 and the positive terminal of the second capacitor C2.

The second switch Sw4 connects the negative side terminal IN2 to the negative terminal of the second capacitor and the negative side output terminal OUT2.

The DC-DC converter 3C according to the fourth embodiment has the same operation and advantageous effect as the DC-DC converter 3 according to the first embodiment as well as can decrease the number of switches using switching operation (rectifying operation) by the diode, and thus can decrease a manufacturing cost. Further, the power supplying system 1C according to the fourth embodiment has the same advantageous effect as the power supplying system 1 according to the first embodiment.

As mentioned above, the DC-DC converters and the power supplying systems of the present invention have been described. However, the present invention is not limited to these embodiments. For example, in the DC-DC converters 3B and 3C with the switching parts 6B and 6C, the voltage difference between the first and second capacitors C1 and C2 can be decreased by varying the phase of the pulse through the second duty control method. In the power supplying system including the DC-DC converter having this configuration, the current sensor 4 and the powering/regenerating discriminating part 5 can be omitted.

Further, the voltage difference calculating part, the proportional and integral unit, and the duty ratio control part in the DC-DC converter can be configured with special hardware or a computer system with memories and a CPU (central processing unit) with software (programs for the functions of the voltage balance control part 20).

In addition, in the respective embodiments of the DC-DC converters, the inductor L is provided. However, in a case where the DC-DC converter has a simple configuration with only the conduction mode and twice boosting mode without outputting an intermediate voltage, the inductor L can be omitted.

The present invention is applicable to various power supplying system such as fuel cell vehicles, hybrid electric vehicles, electric vehicles, a solar power generation system.

The invention claimed is:

1. A DC-DC converter comprising: a first input-output circuit; first and second capacitors connected in series; a second input-output circuit connected to the first and second capacitors; a switching part, responsive to switching signals comprising: a first switch configured to connect a positive side terminal of the first input-output circuit to a positive terminal of the first capacitor and a positive side terminal of the second input-output circuit; a second switch configured to connect the positive side terminal of the first input-output circuit to a negative terminal of the first capacitor and a positive terminal of the second capacitor; a third switch configured to connect a negative side terminal of the first input-output circuit to the negative terminal of the first capacitor and the positive terminal of the second capacitor; and a fourth switch configured to connect the negative side terminal of the first input-output circuit to a negative terminal of the second capacitor and the negative side terminal of the second input-output circuit; a voltage detector to detect voltages across the first and second capacitors and a voltage through the first and second capacitors; and a control circuit part configured to generate the switching signals control on the basis of the voltage through the first and second capacitors, and to calculate a difference between the voltages across first and second capacitors, wherein the control circuit part controls a pulse duration in one of the switching signals to control the duty ratios of the switching durations to generate a current flowing in series through the first and second capacitor and to decrease the difference between the voltage of the first capacitor and the voltage of the second capacitor, wherein, when the voltage of the first capacitor is greater than the voltage of the second capacitor, the control circuit part is configured to advance the pulse for the second switch and delay the pulse for the third switch, and wherein, when the voltage of the first capacitor is not greater than the voltage of the second capacitor, the control circuit part is configured to delay the pulse for the second switch and advance the pulse for the third switch.

2. A DC-DC converter comprising: a first input-output circuit; first and second capacitors connected in series; a second input-output circuit connected to the first and second capacitors; a switching part, responsive to switching signals comprising: a first diode configured to connect a positive side terminal of the first input-output circuit to a positive terminal of the first capacitor and a positive side terminal of the second input-output circuit; a first switch configured to connect the positive side terminal of the first input-output circuit to a negative terminal of the first capacitor and a positive terminal of the second capacitor; a second switch configured to connect a negative side terminal of the first input-output circuit to the negative terminal of the first capacitor and the positive terminal of the second capacitor; and a second diode configured to connect the negative side terminal of the first input-output circuit to a negative terminal of the second capacitor and the negative side terminal of the second input-output circuit; a voltage detector to detect voltages across the first and second capacitors and a voltage through the first and second capacitors; and a control circuit part configured to generate the switching signals control on the basis of the voltage through the first and second capacitors, and to calculate a difference between the voltages across first and second capacitors, wherein the control circuit part controls a pulse duration in one of the switching signals to control the duty ratios of the switching durations to generate a current flowing in series through the first and second capacitor and to decrease the difference between the voltage of the first capacitor and the voltage of the second capacitor, wherein, when the voltage of the first capacitor is greater than the voltage of the second capacitor, the control circuit part is configured to advance the pulse for the second switch and delay the pulse for the third switch, and wherein, when the voltage of the first capacitor is not greater than the voltage of the second capacitor, the control circuit part is configured to delay the pulse for the second switch and advance the pulse for the third switch.

3. A DC-DC converter comprising: a first input-output circuit; first and second capacitors connected in series; a second input-output circuit connected to the first and second capacitors; a switching part, responsive to switching signals comprising: a first switch configured to connect a positive side terminal of the first input-output circuit to a positive terminal of the first capacitor and a positive side terminal of the second input-output circuit; a first diode configured to connect the positive side terminal of the first input-output circuit to a negative terminal of the first capacitor and a positive terminal of the second capacitor; a second diode configured to connect the negative terminal of the first capacitor and the positive terminal of the second capacitor to a negative side terminal of the first input-output circuit to; and a second switch configured to connect the negative side terminal of the first input-output circuit to a negative terminal of the second capacitor and the negative side terminal of the second input-output circuit; a voltage detector to detect voltages across the first and second capacitors and a voltage through the first and second capacitors; and a control circuit part configured to generate the switching signals control on the basis of the voltage through the first and second capacitors, and to calculate a difference between the voltages across first and second capacitors, wherein the control circuit part controls a pulse duration in one of the switching signals to control the duty ratios of the switching durations to generate a current flowing in series through the first and second capacitor and to decrease the difference between the voltage of the first capacitor and the voltage of the second capacitor, wherein, when the voltage of the first capacitor is greater than the voltage of the second capacitor, the control circuit part is configured to advance the pulse for the second switch and delay the pulse for the third switch, and wherein, when the voltage of the first capacitor is not greater than the voltage of the second capacitor, the control circuit part is configured to delay the pulse for the second switch and advance the pulse for the third switch.

4. The DC-DC converter as claimed in claim 1, wherein the control circuit part controls a pulse duration to control the duty ratio of at least one of the switching signals to correct an unbalance in the voltage of the first and second capacitors on the basis of the detected voltages across the first and second capacitors.

5. The DC-DC converter as claimed in claim 1, wherein the control circuit part comprises a voltage balance control part configured to decrease the difference:
- a first low-pass filter configured to extract a DC voltage component across the first capacitor;
- a second low-pass filter configured to extract a DC voltage component across the second capacitor;
- a difference calculating part configured to calculate a first difference between the DC voltage components across first and second capacitors and a second difference between the first difference and a reference value;
- a proportion and integral unit configured to generate a control quantity including a proportion control quantity and an integration control quantity on the basis of the second difference; and
- a duty control part configured to control the duty ratio on the basis of the control quantity.

6. A power supplying system comprising:
the DC-DC converter as claimed in claim 5;
a power supply configured to supply a DC voltage to the DC-DC converter;
an electrical rotating machine connected to the DC-DC converter;
a current sensor configured to detect a current flowing between the DC-DC converter and the electrical rotating machine; and
a powering/regenerating discriminating part, connected to the second input-output circuit, configured to determine whether the DC-DC converter is in either a powering mode or a regenerating mode on the basis of the detected current, wherein the voltage balance control part decreases the difference on the basis of the powering mode or the regenerating mode.

* * * * *